Jan. 23, 1962 S. W. BOOTH ET AL 3,017,833

MAGNETIC FIRING CONTROL MECHANISM FOR A MINE

Filed June 8, 1943 10 Sheets-Sheet 1

Inventors
S. W. BOOTH
J. F. TOOMEY
E. M. BROWN

By

Stone E. Bush
Attorney

Inventors
S. W. BOOTH
J. F. TOOMEY
E. M. BROWN

By Stone E Bush
Attorney

Jan. 23, 1962 S. W. BOOTH ET AL 3,017,833

MAGNETIC FIRING CONTROL MECHANISM FOR A MINE

Filed June 8, 1943 10 Sheets-Sheet 3

Inventors
S. W. BOOTH
J. F. TOOMEY
E. M. BROWN

By Stone E. Bush
Attorney

Inventors
S. W. BOOTH
J. F. TOOMEY
E. M. BROWN

By Stone & Bush
Attorney

MAGNETIC FIRING CONTROL MECHANISM FOR A MINE

Filed June 8, 1943 10 Sheets-Sheet 5

Inventors
S. W. BOOTH
J. F. TOOMEY
E. M. BROWN

By

Stone E. Bush
Attorney

Jan. 23, 1962 S. W. BOOTH ET AL 3,017,833

MAGNETIC FIRING CONTROL MECHANISM FOR A MINE

Filed June 8, 1943 10 Sheets-Sheet 6

Inventors
S. W. BOOTH
J. F. TOOMEY
E. M. BROWN

By

Stone E. Bush
Attorney

Jan. 23, 1962 S. W. BOOTH ET AL 3,017,833

MAGNETIC FIRING CONTROL MECHANISM FOR A MINE

Filed June 8, 1943 10 Sheets-Sheet 7

Inventors
S. W. BOOTH
J. F. TOOMEY
E. M. BROWN

By Stone E. Bush
Attorney

Jan. 23, 1962 S. W. BOOTH ET AL 3,017,833

MAGNETIC FIRING CONTROL MECHANISM FOR A MINE

Filed June 8, 1943 10 Sheets-Sheet 8

Inventors
S. W. BOOTH
J. F. TOOMEY
E. M. BROWN

By Stone & Bush
Attorney

MAGNETIC FIRING CONTROL MECHANISM FOR A MINE

Filed June 8, 1943 10 Sheets-Sheet 9

Inventors
S. W. BOOTH
J. F. TOOMEY
E. M. BROWN
By
Stone E Bush
Attorney

MAGNETIC FIRING CONTROL MECHANISM FOR A MINE

Filed June 8, 1943 10 Sheets-Sheet 10

Inventors
S. W. BOOTH
J. F. TOOMEY
E. M. BROWN

By Stone E. Bush
Attorney

United States Patent Office 3,017,833

Patented Jan. 23, 1962

3,017,833

MAGNETIC FIRING CONTROL MECHANISM FOR A MINE

Seth W. Booth, Hyattsville, Md. (Los Angeles, Calif.); John F. Toomey, Floral Park, N.Y. (On Top o' The Hill, Chilmark, Mass.); and Ellis M. Brown, 4134 Wilada, Dallas 20, Tex.

Filed June 8, 1943, Ser. No. 490,044
18 Claims. (Cl. 102—18)
(Granted under Title 35, U.S. Code (1952), sec. 266)

This invention relates to firing mechanisms for a mine and more particularly to a firing mechanism in which a plurality of control circuits are closed in predetermined time relation by a motor driven timing device selectively under control of a signal received through the water by a signal detecting device.

It is the usual practice, in certain types of mines, to cause the mine to become active in response to a particular characteristic of a signal received from a vessel within the vicinity of the mine wherein means are employed for preventing the mine from being fired until a predetermined period of time has elapsed after the particular characteristic of the signal has been received. When this predetermined period of time has elapsed the mine is armed or merely placed in condition to receive a second signal or a second characteristic of the original signal accompanying the vessel, as the case may be, and remains armed for a period of time sufficient to receive the second characteristic or signal. In the event that the second characteristic or signal is received within the armed period of the mine, the mine is exploded or a signal corresponding to a pair of such signals or signal characteristics is stored within a storage mechanism, as the case may be. When a sufficient number of pairs of signal indications corresponding to the first and second of said signals respectively are received in predetermined time space relation and a signal corresponding thereto is stored by the aforesaid storage mechanism, the mine is exploded. In the event, however, that a second signal is not received during the armed period of the mine the mine firing control mechanism is restored to normal without increasing the number of signal indications stored by the storage mechanism and without firing the mine.

In devices heretofore proposed for controlling the firing of a mine selectively in accordance with the reception of a pair of signals corresponding to different characteristics or elemental portions of a signal received through the water or from two signals received through the water, as the case may be, within a predetermined period of time it has been the usual practice to employ certain storage mechanisms and time measuring delay devices comprising switch mechanisms both of the step-by-step type and of the type adapted to control the time of operation of the switching contacts thereof by clock movements, escapement devices, dash-pots and the like. Such devices have not proved altogether satisfactory in service for the reason that the devices are relatively susceptible to damage or injury thereto as the result of the shock or blow which the mine receives at the moment of launching, particularly in the case where the mines are launched from an aircraft in flight, by reason of the relatively delicate elements comprising the structure.

In the arrangement of the present invention these difficulties are avoided by providing a rugged circuit controlling mechanism comprising a plurality of cam controlled electrical contacts adapted to be operated in succession in predetermined sequential order by an electric motor by reason of the relative position of the cams and the contacts with respect to one another, the arrangement of the cams upon a rotatable member and the provision of certain speed reducing devices operatively coupled to the rotatable member and adapted to control the movements of the various cams in predetermined time relation and the operation of the associated contacts actuated thereby.

One of the objects of the present indication is to provide a new and improved timing mechanism for selectively controlling the firing of a marine mine.

Another of the objects is to provide a new and improved control mechanism for a mine adapted to fire the mine in response to a signal indication comprising two elemental signal portions received in predetermined time relation through the surrounding water.

Another object is to provide a new and improved mechanism for firing a mine selectively in accordance with the number of signal indications in which each of the signal indications comprises a pair of elemental signals received in predetermined time spaced relation from a vessel.

Another object resides in the provision of a new and improved mine firing control mechanism having means settable at will for controlling the number of signals necessary to fire the mine.

Another object resides in the provision of a mine firing arrangement comprising a pair of timing and control mechanisms adapted to be set in operation selectively and successively in accordance with the polarity of signals received from a vessel through the surrounding water.

A further object is the provision of a timing mechanism for a mine adapted to close a plurality of groups of contact elements invariably in predetermined time relationship which is rugged in construction, durable in service and which possesses the additional quality of reliability of operation in service.

Still other objects, advantages and improvements will be apparent from the following description taken in connection with the accompanying drawings of which:

Figure 1:
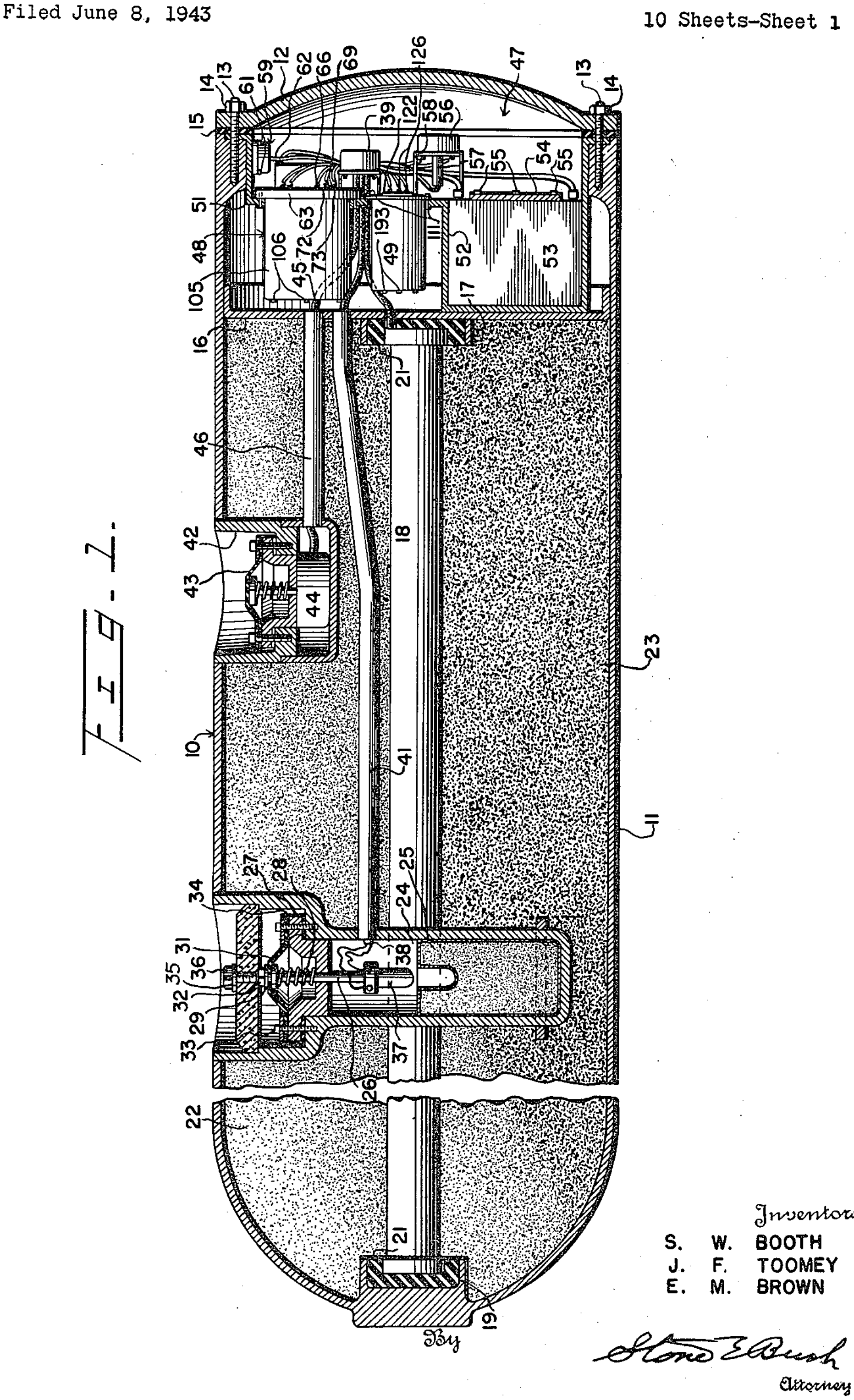
FIG. 1 is a view in section of a mine suitable for use with the device of the present invention.
Figure 2:
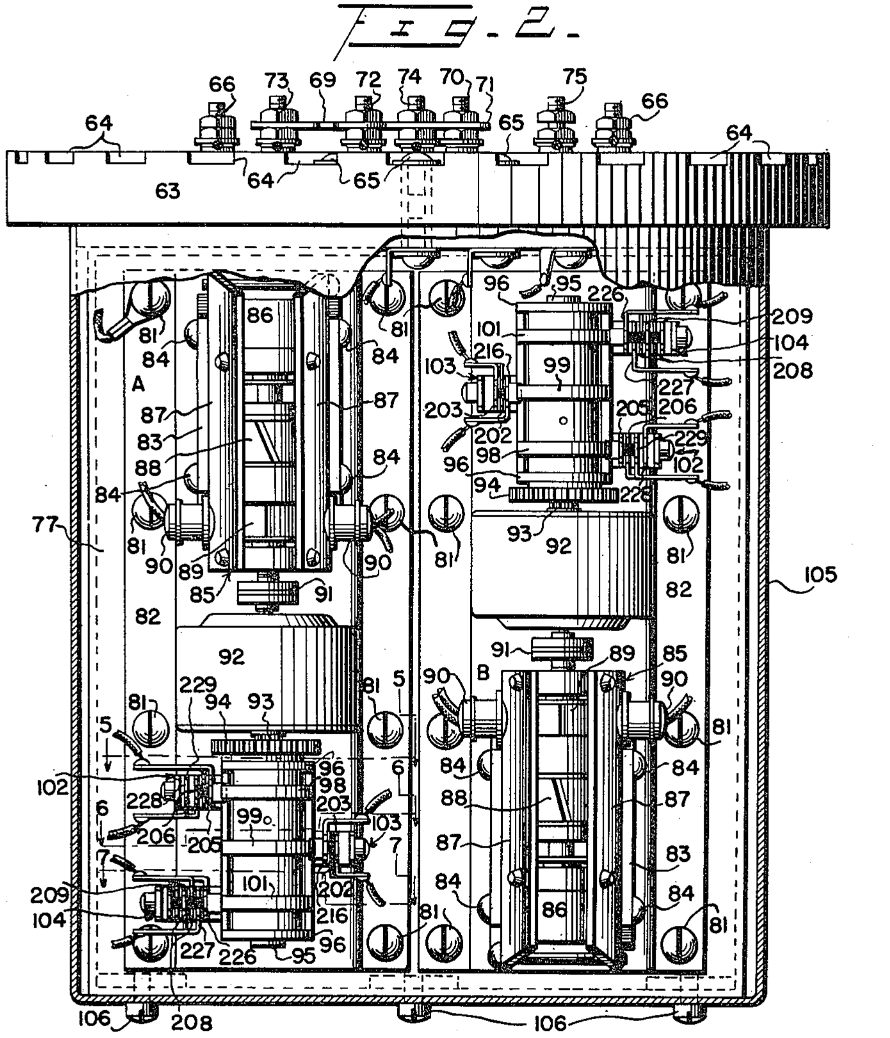
FIG. 2 is an enlarged view, partially broken away and partially in section, of the timing mechanism employed with the mine of FIG. 1 according to a preferred embodiment thereof.
Figure 3:
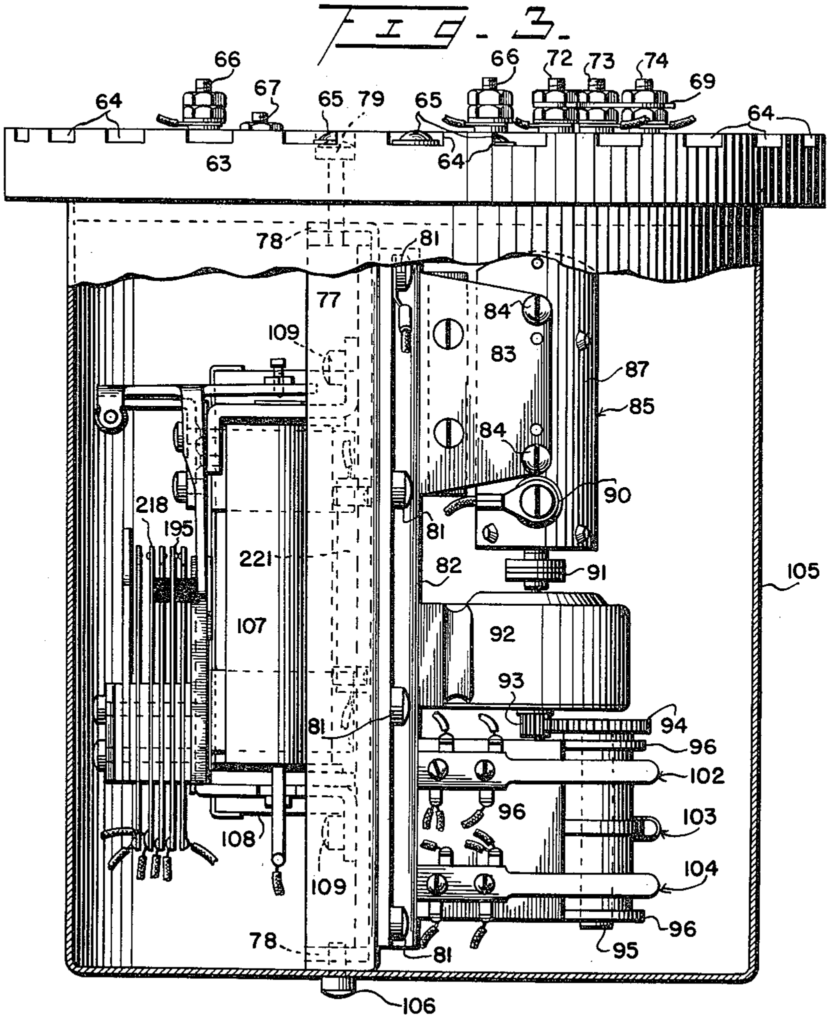
FIG. 3 is a view, partially in section and partially broken away, of the timing device of FIG. 2 showing one of the control relays.

Referring now to the drawings for a more complete understanding of the invention and more particularly to FIG. 1 thereof there is shown thereon a mine indicated generally by the numeral 10 having a casing 11 adapted to be sealed by a cap or cover 12 secured thereto as by the studs 13 and nuts 14 threaded thereon, a gasket 15 being preferably arranged between the cover and the casing to insure a watertight joint therebetween. There is arranged within the casing 11 a wall or partition 16 having an annular support 17 secured thereto adapted to receive one end of an induction pickup coil 18 comprising a relatively large number of turns of wire arranged about a rod of iron or composed of a material sold under the trade name of Permalloy or Mumetal. The other end of the coil is disposed within a recessed portion 19 of the casing 11, suitable pads or cushions 21 being arranged between the ends of the coil and the recessed portion 19 and support 17 respectively to prevent damage or injury to the coil as the mine is launched.

The partition 16 also forms a chamber 22 within which is arranged an explosive charge 23 of TNT or the like sufficient to destroy a vessel and to impart a negative degree of buoyancy to the mine whereby the mine is adapted to come to rest on the bed of a body of water after being launched therein.

There is also provided within the chamber 22 a well 24 within which is arranged an explosive booster charge 25 as is well known in the art to which the invention pertains. There is also arranged within the well 24 a hydrostat mechanism comprising a plunger or rod 26 slideably arranged within the support 27 and normally urged outwardly therefrom by a spring 28 in engagement with the collar 29 secured to the plunger. A flexible diaphragm 31 is clamped to the collar as by the nut 32, the diaphragm being maintained in watertight relation with respect to the well 24 as by the bolts 33 and a clamping ring 34. A soluble washer 35 secured to the plunger as by the nut 36 prevents the inward movement of the plunger until the mine has been planted for a period of time sufficient to dissolve or soften the soluble washer. When this occurs, the detonating device 37 is moved by the plunger into operative relation with respect to the booster charge 25. The detonating device 37 is connected electrically by means of a pair of conductors within the cable 38 to a junction or connection box 39, a tube or duct 41 being provided between the well 24 and the partition 16 to support and protect that portion of the cable disposed within the explosive charge within the chamber 22.

The mine is also provided with a recess or well 42 within which is arranged a hydrostat 43 adapted to set an arming clock 44 into operation in response to the movement of the hydrostat under the influence of the pressure of the surrounding water. The arming clock may be of any type suitable for the purpose adapted to close a circuit between the pair of conductors within the cable 45 connected thereto such, for example, as the arming clock described and claimed in the copending application of James B. Glennon et al. for Firing Mechanism For a Submarine Mine, Serial No. 395,230, filed May 26, 1941 now Patent No. 2,905,088. The cable 45 is preferably arranged within a tube or duct 46 extending between the well 42 and the partition 16.

From the foregoing it will be apparent that the partition 16 divides the casing of the mine into two portions or chambers of which the chamber 22 is filled with an explosive charge. The remaining chamber, indicated generally by the numeral 47, has arranged therein certain timing and mine firing control mechanisms indicated generally by the numeral 48 and a storing and counting mechanism 49 adapted to store and count signal indications received from the control mechanism 48 and cause the mine to be fired after a predetermined number of such indications have been stored therein. The mechanisms 48 and 49 are electrically connected to the connecting box 39 by a plurality of suitable conductors or cables. The devices 48 and 49 are secured to the casing of the mine in any suitable manner as by the support 51, the support preferably having a well 52 therein within which is arranged a battery 53, hereinafter referred to as BA, a clamping device 54 secured to the support 51 as by the bolts 55 preferably being provided to prevent damage or injury to the battery as the mine is launched.

A polarized relay 56, hereinafter referred to as D, is operatively connected to the coil 18, the relay having a reset magnet 57 adapted to restore the moving element of the relay to an initial neutral position intermediate a pair of contacts. The relay is mounted in any suitable manner as by the support 58. There is also provided an inertia operated switch 59 secured to the casing of the mine in any suitable manner as by the bolts 61 adapted to connect together a pair of conductors within the cable 62 as the switch operates in response to a shock or impulse received by the mine. The switch may be of any type suitable for the purpose such, for example, as the inertia switch disclosed and claimed in the copending application of Seth W. Booth for Inertia Switch And Means Controlled Thereby, Serial No. 484,854, filed April 28, 1943 now Patent No. 2,968,240.

When the mine receives a sudden shock or impulse such, for example, as may result from the explosion of a torpedo or another mine within the vicinity of the mine of FIG. 1, or as the result of a countermining operation, the operation of the inertia switch 59 prevents the mine from being fired by the shock received, as will more clearly appear as the description proceeds.

The timing and control mechanism 48 will best be understood by consideration of FIGS. 2 to 7 on which is shown a timing and control structure according to a preferred embodiment of the invention, the mechanism comprising, among other elements, a base 63 composed preferably of insulating material suitable for the purpose such, for example, as a material sold under the trade name of Bakelite and having a plurality of recessed portions 64 therein within which are arranged a plurality of screw terminals 65 adapted to establish a plurality of external circuit connections to the device. The base 63 is also provided with a plurality of additional terminals 66 and 67, the terminals 67 preferably being disposed within recessed portions 68 of the base thereby to facilitate the establishment of an electrical circuit thereto. There is also provided on the base 63 a pair of connecting devices 69 and 71, the device 69 being adapted to establish an electrical connection between the terminal 72 and the terminals 73 and 74 selectively in accordance with the assembled position of the device 69. In a similar manner the connecting device 71 is adapted to establish an electrical connection between the terminal 70 and the terminals 74 and 75 selectively in accordance with the assembled position of the connecting device 71. From the foregoing it will be apparent that the connecting devices 69 and 71 are adapted to be rotatively moved about the terminals 72 and 70 respectively thereby providing a double pole double throw switch. The base 63 is adapted to be connected to the support 51, FIG. 1, by a plurality of bolts arranged within the apertures 76, FIG. 4, circumferentially arranged within the base.

There is also provided a plate or support 77 having reinforcing edge portions 78, the support being secured to the base 63 as by the screws 79. Secured to the plate 77 as by the screws 81 is a supporting member 82 having a pair of mounting members 83 supported thereby to which is secured as by the screws 84 a motor indicated generally by the numeral 85 comprising a fixed permanent magnet 86 adapted to set up a strong magnetic field between a pair of pole pieces 87 within which is rotatably mounted the armature 88 having a winding thereon connected to a commutator 89 in continuous engagement with a pair of brushes 90. The motor is connected as by the coupling 91 to a gear box 92 supported by the member 82 whereby the gear 93 connected thereto is adapted to rotate at a greater reduced speed of rotation than the motor 85. The gear 93 is in mesh with a gear 94 mounted on a shaft 95 and rotatable therewith. The shaft 95 is supported rotatably by the support 96 secured to the supporting member 82 as by the screws 97, FIGS. 5 to 7, and has mounted thereon a plurality of cams 98, 99 and 101 adapted to control the contact spring devices indicated generally by the numerals 102, 103 and 104 respectively.

Figure 5:
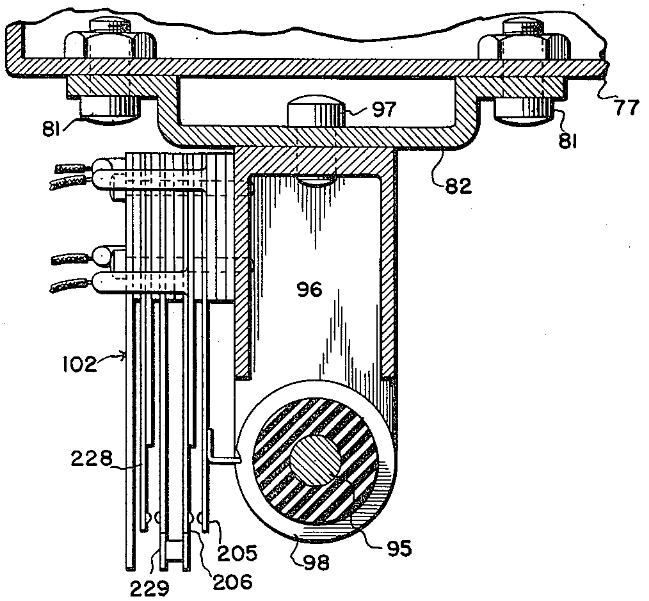
FIG. 5 is an enlarged view taken along the line 5—5 of FIG. 2.
Figures 6, 7:
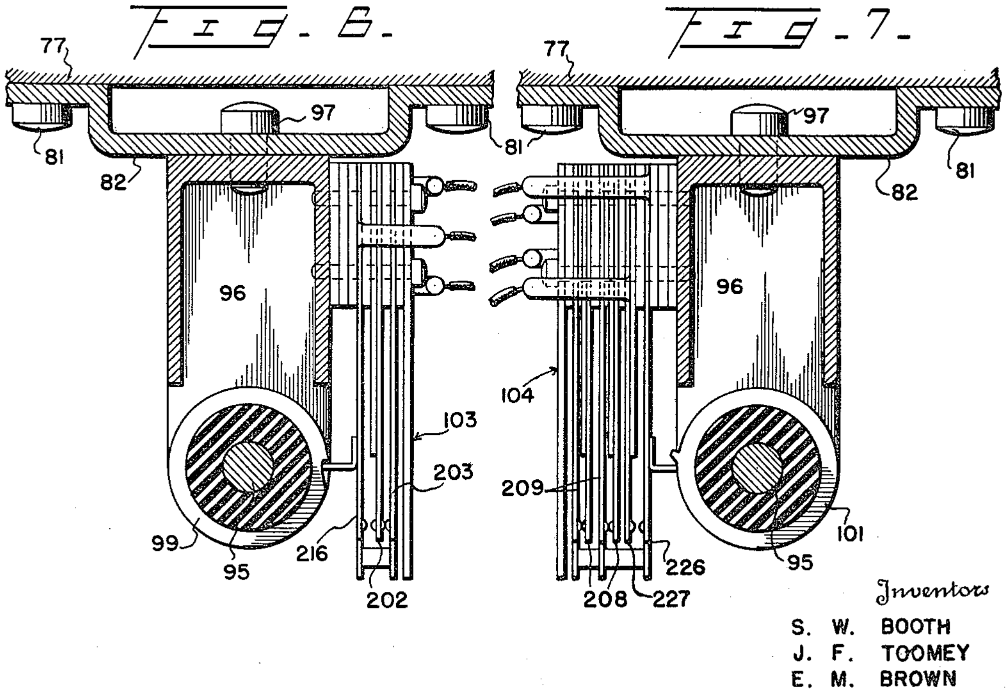
FIG. 6 is an enlarged view taken along the line 6—6 of FIG. 2.
FIG. 7 is an enlarged view taken along the line 7—7 of FIG. 2.
Figure 10:
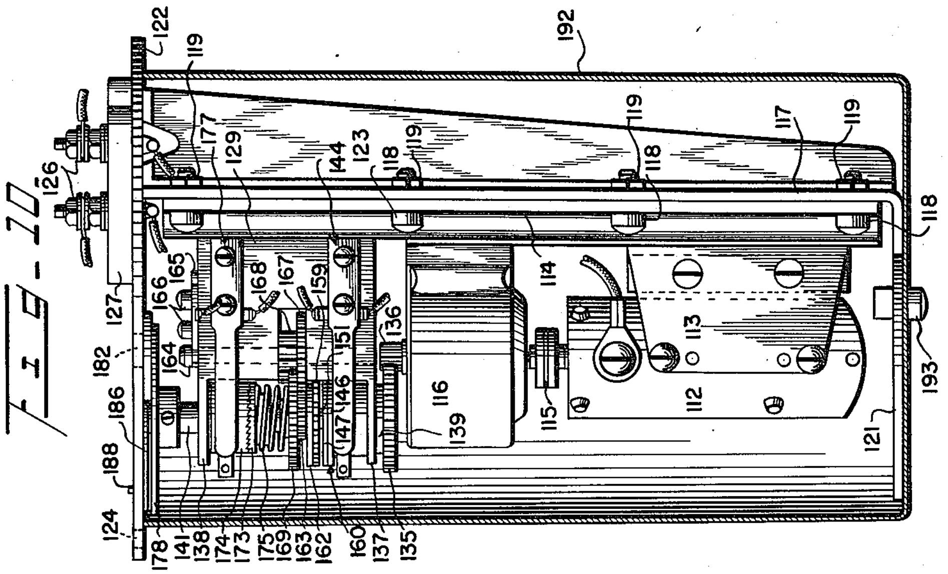
FIG. 10 is a side view of the device of FIG. 9.
Figure 9:
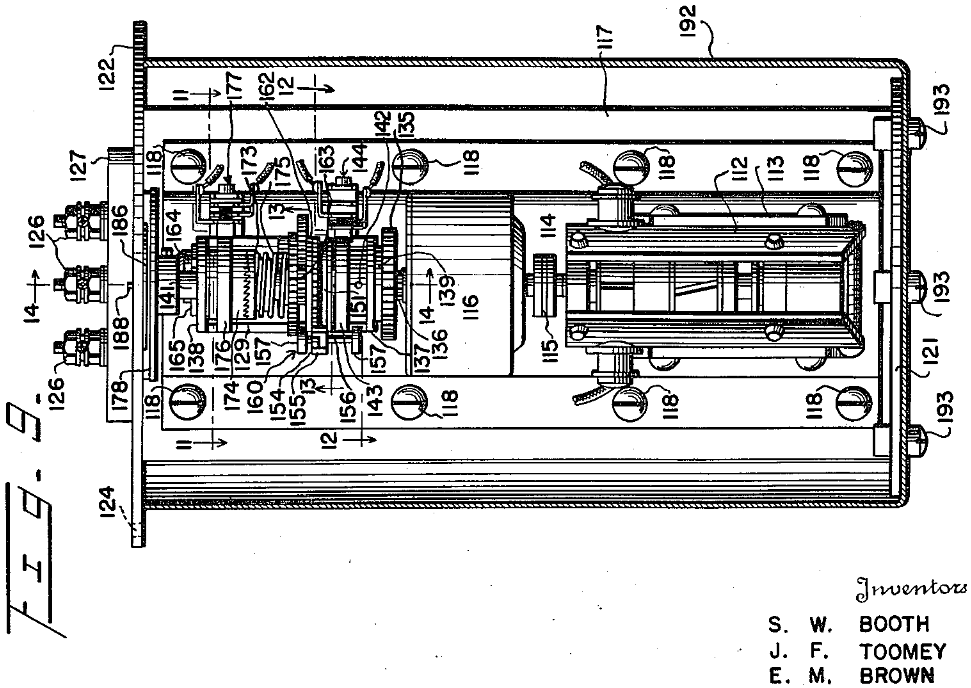
FIG. 9 is a plan view of the counting and storage mechanism of FIG. 8 with the cover in section.

The contact spring device 102, FIG. 5, comprises two pairs of normally open contact springs adapted to be moved to closed position as the cam 98 moves away from the initial home or rest position thereof and remain closed until the cam returns to the home position at the completion of a revolution. The contact spring device 103, FIG. 6, comprises a pair of normally closed contacts adapted to be opened as the cam 99 moves away from the initial home position thereof and a pair of normally open contacts adapted to be closed as the normally closed contacts are opened, the normally open contact springs remaining closed until the cam has made a revolution. When this occurs, the normally open springs are disengaged and the normally closed springs brought into engagement with each other during the movement of the cam 99 into the home position. The contact spring device 104, FIG. 7, comprises two normally closed pairs of contacts and a normally open pair of contacts adapted to be actuated at the completion of a predetermined interval of time such, for example, as three seconds after the cam 101 has been set in operation and remain in the actuated position for a time interval of substantially one second. At the completion of the last named time interval the contact springs are restored to their initial positions. The purpose and function of the various contact elements comprising the contact spring devices 102, 103 and 104 will be more clearly apparent as the description proceeds. The mechanism comprising the cam actuated contact spring devices 102, 103 and 104 and the operating means therefor including the motor 85 and gear box 92 is hereinafter referred to as a timing or control device indicated generally by the letter A.

There is also mounted on the plate 77 a second timing device comprising a plurality of cam actuated contact elements and operating means therefor including a motor and gear box generally similar to the timing mechanism A, and designated generally by the numeral B, the electrical circuit connections to the timing devices A and B being established by way of the aforesaid terminal connections on the respective bases 63. Each of the timing devices A and B is preferably enclosed within a cover 105 secured to the plate 77 as by the screws 106, the cover for timing device B also enclosing a relay 107 hereinafter referred to as R and a condenser 108 secured to the plate 77 thereof as by the screws 109. In a similar manner a relay designated E and a condenser associated therewith are secured to the plate 77 of the timing device A.

There is also secured to the support 51, FIG. 1, as by the screws 111 the counting device 49 adapted to be operated by an electric motor 112 comprising a base 113 secured to a plate 114, the motor being operatively connected as by the coupling 115 to a gear box 116, the motor and gear box preferably being similar to the motor and gear box employed with each of the timing mechanisms A and B. The plate 114 is secured to a support 117 as by the bolts 118 and nuts 119, FIGS. 11 and 12, the support 117 having a bent up portion 121 at one end and secured in any suitable manner to the supporting plate 122 at the opposite end thereof, a bracing member 123 suitable for the purpose being provided preferably to strengthen and additionally support the supporting member 117 with respect to the plate 122. The plate 122 is provided with a plurality of circumferentially arranged apertures 124, FIG. 8, whereby the plate is adapted to be secured to the support 51 within the mine of FIG. 1. The supporting plate 122 is also provided with an aperture 125, FIG. 8, adapted to receive a plurality of terminal connections 126 arranged on an insulating block 127 secured to the supporting plate 122 as by the screws 128 thereby to establish a plurality of external circuit connections to the device.

Figure 11:
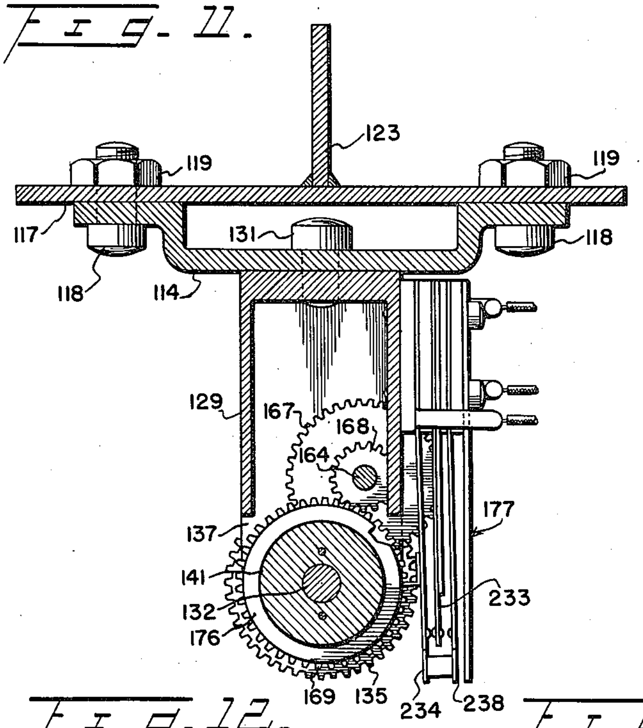
FIG. 11 is an enlarged view taken along the line 11—11 of FIG. 9.
Figure 12:
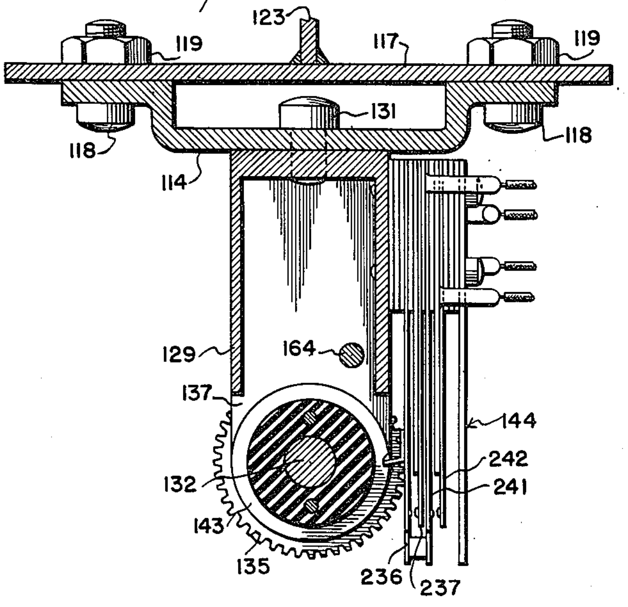
FIG. 12 is an enlarged view taken along the line 12—12 of FIG. 9.

There is also provided a support 129 secured to the plate 114 as by the screws 131, FIGS. 11 and 12, having a shaft 132 journaled therein. The shaft 132 has an enlarged portion 133 thereon and a reduced portion 134 to which is secured a gear 135 suitable for meshing with the gear 136 connected to the gear box 116. The support 129 comprises a pair of end portions or plates 137 and 138, the plate 137 having a bearing therein within which the shaft 132 is rotatably disposed at the portion 133 thereof, a washer 139 being preferably disposed about the shaft intermediate the gear 135 and the plate 137. The opposite end of the shaft 132 is rotatably arranged within a cylindrical member 141 and supported thereby, the cylindrical member being arranged for rotative movement within a bearing in the end plate 138.

Secured to the shaft 132 as by a pin 142 is a cam 143 adapted to control the operation of the contact spring assembly indicated generally by the numeral 144 as the cam rotates. Secured to the end of the cam as by the screws 145 is a pair of disks 146 and 147, FIG. 14, the disks 146 and 147 being provided with apertures 148, FIG. 13, within which the screws 145 are disposed. There is also secured to the disks 146 and 147 as by the pins 149, FIG. 13, a driving fork 151 having a notched portion 152 therein in substantial abutting relation with a notched portion 153 within the disk 147 and adapted to engage the teeth of an idle wheel or gear 154 at the notched portion thereof. The gear 154 comprises six teeth adapted to be engaged by the driving fork when the motor C has been operating for substantially 140 seconds of which three of these teeth designated 155 are adapted to pass within the notch in the disk 147 in succession during successive engagements of the gear 154 by the fork and lock the gear 154 against rotation at all times when a tooth 155 of the gear 154 is disengaged from the aforesaid notched portion 153 of the disk 147. From the foregoing it will be apparent that an arrangement, indicated generally by the numeral 160, similar to a Geneva mechanism is provided in which the gear 154 moves intermittently and makes one revolution during three revolutions of the gear 135. The gear 154 is rotatably mounted on a shaft 156 supported by the bracket 157 secured to the support 129 as by the screws 158, FIG. 13. The gear 154 is in continuous meshed engagement with a gear 159 secured to the hub 161 and to the disk 162, the gear 159 having a gear 163 affixed thereto of lesser diameter than the gear 159. The hub is rotatably mounted on the shaft 132 and adapted to be operated intermittently by the gear 154 in response to the engagement of the gear 154 by the driving fork 151.

Figure 13:
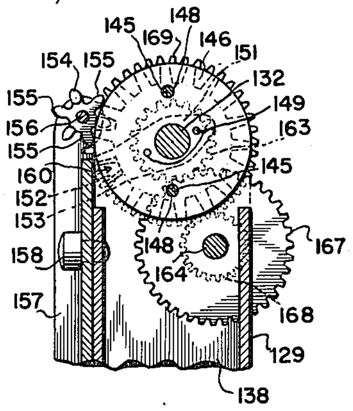
FIG. 13 is an enlarged view taken along the line 13—13 of FIG. 9.
Figure 14:
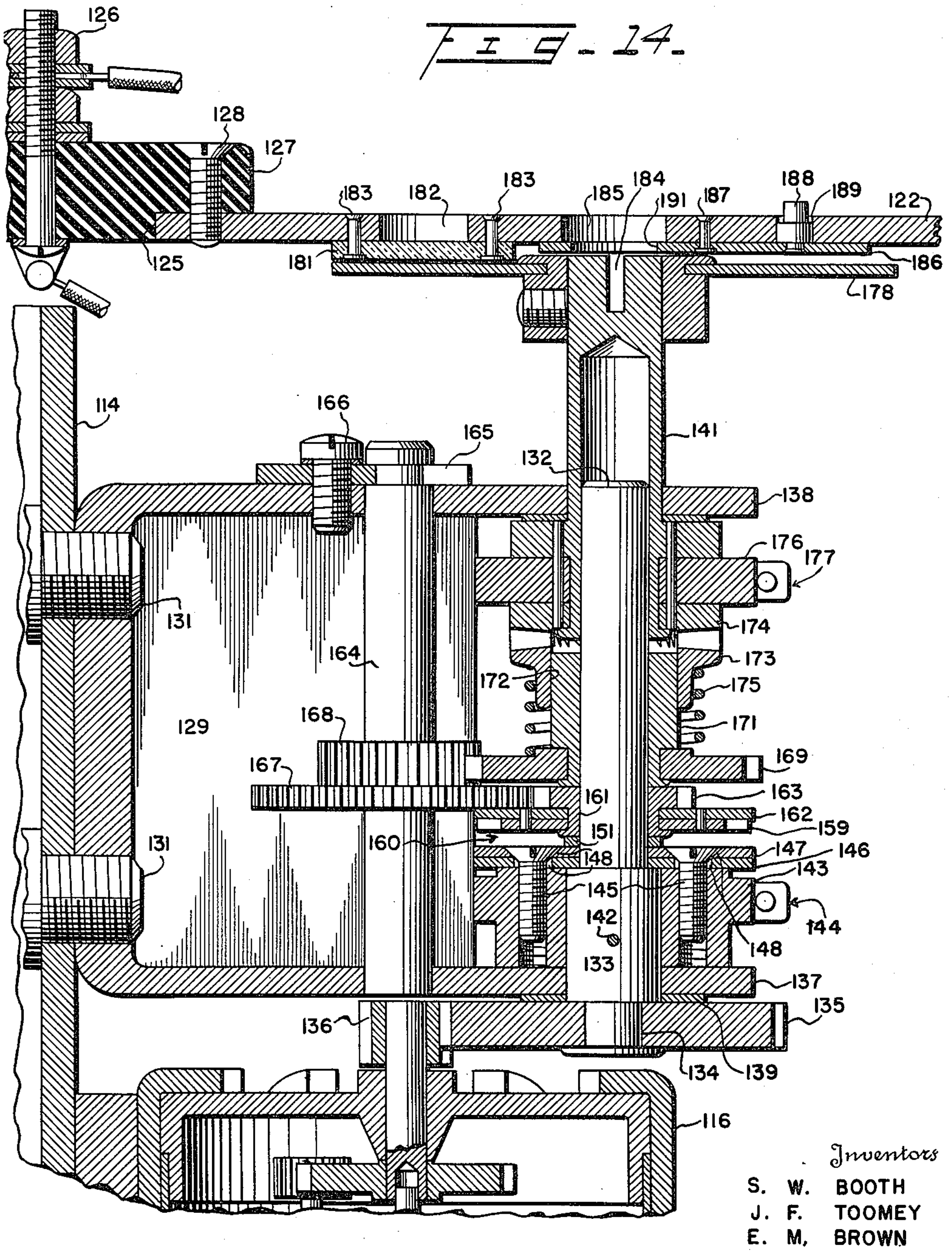
FIG. 14 is an enlarged view taken substantially along the line 14—14 of FIG. 9.

Supported by the plates 137 and 138 is a shaft 164, FIGS. 13 and 14, having a bifurcated locking member 165 in engagement with complementary notched portions at one end of the shaft and secured to the plate 138 as by screws 166 thereby to prevent substantial endwise movement of the shaft. Rotatably mounted upon the shaft 164 is a pair of connected gears 167 and 168, the gear 167 being in continuous engagement witn the aforesaid gear 163 and the gear 168 being meshed with a gear 169 secured to the sleeve 171 rotatably mounted on the shaft 132. The sleeve 171 is provided with a splined portion 172 having a ratchet gear or clutch 173 slideably mounted thereon. The clutch 173 is yieldably urged against a complementary toothed member 174 by a spring 175, the toothed member 174 being fixed to and rotatable with the cylindrical member 141. There is also secured to the sleeve member 141 a rotatable cam 176 adapted to operate the contact spring assembly indicated generally by the numeral 177 to a closed or arming position when the cam 176 has been moved to a final or firing position from a predetermined setting corresponding to the number of pairs of signals to be received by the mine through the water as a prerequisite condition to the firing of the mine.

Figures 4, 8:
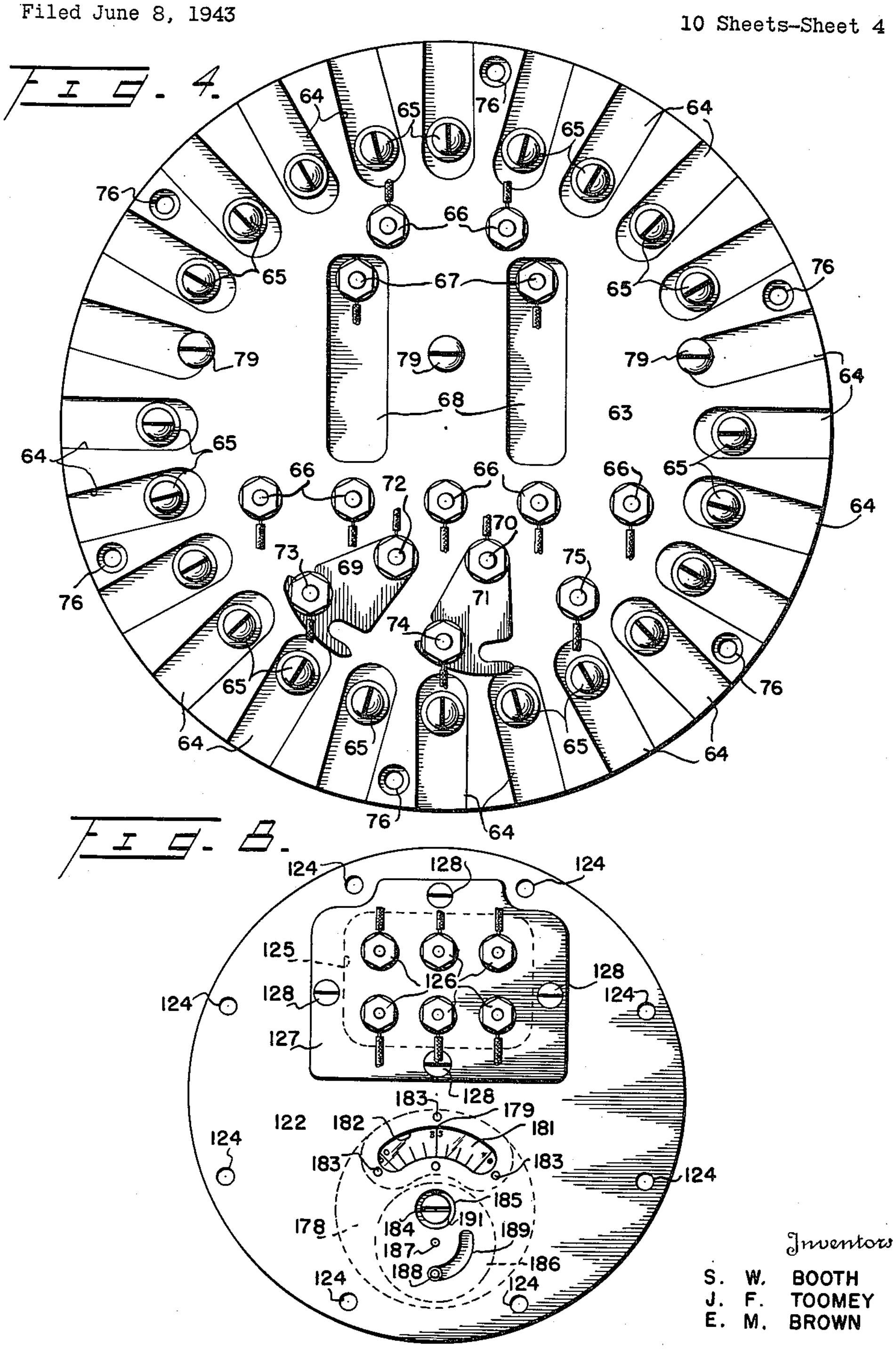
FIG. 4 is a plan view of the device of FIG. 2.
FIG. 8 is an end view of the counting mechanism employed with the mine of FIG. 1.

There is affixed to the end portion of the cylindrical member 141 a rotatable disk or dial 178 having a plurality of scale divisions and indicia thereon adapted to be brought into substantial alinement selectively with reference line 179 preferably arranged on a plate 181 of suitable transparent material mounted in substantial abutting relation with an aperture 182 within the supporting plate 122 by a plurality of rivets or screws 183, FIG. 8. The end of the member 141 is slotted or otherwise formed as at 184 to receive a tool such, for example, as a screw driver adapted to be inserted within an aperture 185 in the plate 122 thereby providing an arrangement in which the dial 178 may be set to any desired setting by the aforesaid tool corresponding to the number of pairs of signals necessary to fire the mine, the dial 178 and cylindrical member 141 secured thereto being settable with respect to the shaft 132 by reason of the provision of the clutch device comprising the toothed members 173 and 174. Preferably, though not necessarily, a disk member 186 pivotally mounted on the plate 122 as at 187 may be provided, the disk having a pin 188 secured thereto and arranged within an arcuately shaped slot 189 whereby the disk may be rotated about the pivot bearing 187 through a predetermined angle determined by the length of the slot such that an aperture 191 within the disk is in alinement with the aperture 185 within the plate 122 or the aperture 185 is closed by the aforesaid disk, as the case may be. There is also provided a cover 192 adapted to enclose and protect the counting and storage mechanism, the cover being maintained in continuous abutting relation with the supporting plate 122 by a plurality of screws 193 threaded within the bent up portion 121 of the support 117.

Figure 15:
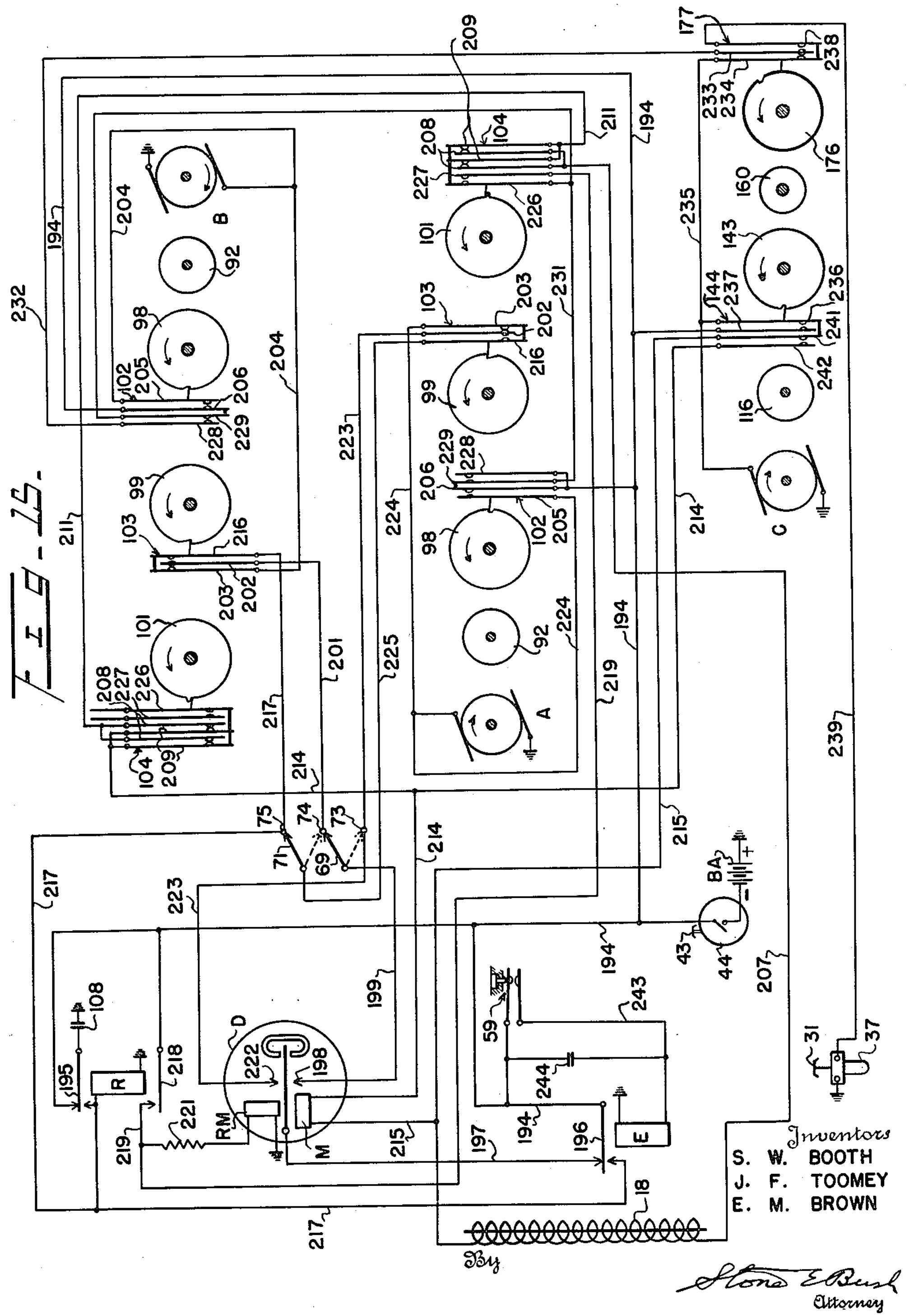
FIG. 15 illustrates in diagrammatic form a complete system suitable for use with the mine of FIG. 1 according to a preferred embodiment of the invention.

The operation of the system will best be understood by consideration of FIG. 15 of the drawings on which is shown in diagrammatic form a complete system in accordance with a preferred embodiment of the invention suitable for use with the mine of FIG. 1. Let it be assumed, by way of example, that the switching devices 69 and 71 are connected in the position shown in solid outline and that the counting and storage device has been set to count thirty-five ships before the mine is fired. Let it further be assumed that the mine has been planted within a body of water of sufficient depth to cause the clock hydrostat 43 to operate thereby setting the arming clock 44 in operation, and that a period of time has elapsed sufficient for the soluble washer 35 to dissolve and allow the detonating device 37 to be moved into operative relation with respect to the explosive booster charge 25 by the pressure of the surrounding water against the flexible diaphragm 31 of the extender hydrostat. When the contacts of the arming clock 44 are moved into engagement with each other by the clock mechanism a circuit is closed from negative terminal of battery BA by way of the contacts of the arming clock, conductor 194, break contact and armature 195 of relay R and thence by way of condenser 108 to ground thereby charging condenser 108 to the potential of battery BA.

For the purpose of description it may be assumed that the armature of relay D is resting against contact 198 as the result of a shock received during the launching of the mine and the operation of the contacts of the arming clock, therefore, applies negative battery by way of conductor 194, armature 196 and break contact of relay E, conductor 197 to the armature and contact 198 of relay D from whence the circuit is continued by way of conductor 199, switching element 69 and terminal 74 thereof, conductor 201, contact springs 202 and 203 of spring device 103 of the timing mechanism B, conductor 204, motor of timing mechanism B and thence to ground thereby setting the motor B in operation. When motor B has been running for a period of substantially one second cam 98 is moved sufficiently for contact spring 205 to be moved into engagement with contact spring 206. When this occurs, a circuit is closed from negative terminal of battery BA by way of contacts of clock 44, conductor 194, contacts 206 and 205 of cam 98 of mechanism B, conductor 204 and motor B from whence the circuit is continued to ground thereby insuring that motor B will continue to operate until cam 98 moves into the initial home position at the completion of the instant revolution thereof.

When the motor B has been operating for substantially three seconds the contact spring assembly 104 thereof is operated by the cam 101 thereby interrupting the following circuit: lower end of induction pickup coil 18, conductor 207, contact springs 208 and 209 of contact assembly 104 of timing device A, conductor 211, contact springs 208 and 209 of contact assembly 104 of timing mechanism B, conductor 214, winding of the operating magnet M of relay D, conductor 215 and thence to the upper end of the winding of the pickup coil 18. Cam 101 is arranged to maintain contacts 208 disengaged from contacts 209 for substantially one and one-half seconds.

When the motor B has been running for approximately four seconds the cam assembly 103 is actuated by the cam 99 whereby contact spring 203 is disengaged from contact spring 202 and contact spring 216 is brought into engagement with contact spring 202. As contact spring 203 moves away from contact spring 202 the circuit from contact 198 of relay D to the motor B is interrupted and as contact spring 216 engages contact spring 202 a circuit is closed from negative terminal of battery BA by way of contacts of the arming clock, conductor 194, armature 196 and break contact of relay E, conductor 197, armature and contact 198 of relay D, conductor 199, switching element 69 and terminal 74 thereof, conductor 201, contact springs 202 and 216, conductor 217, winding of reset relay R from whence the circuit is continued to ground thereby causing relay R to operate. As armature 218 of relay R moves into engagement with its make contact a circuit is closed from negative battery on conductor 194 by way of armature 218 and make contact of relay R, conductor 219, resistance 221 to the reset magnet RM of relay D from whence the circuit is continued to ground thereby causing the reset magnet to operate and restore the armature of relay D to an initial position intermediate the contacts 198 and 222 and disengaged therefrom.

As the armature of relay D moves away from contact 198 the circuit between the winding of relay R and the negative terminal of battery BA is interrupted but relay R does not release immediately, however, for the reason that the winding thereof is connected by way of make contact and armature 195 of relay R to the charged condenser 108. The resistance of the winding of relay R and the size of the condenser are preferably selected such that the discharge current from the condenser through the relay winding is sufficient to prevent the release of relay R until the armature of relay D has been restored by the restore magnet RM to the initial neutral position thereof. When the charge on the condenser 108 has been sufficiently dissipated relay R releases. As armature 195 of relay R moves away from the make contact thereof condenser 108 is disconnected from the winding of relay R and as the armature 195 moves into engagement with the break contact thereof condenser 108 is again charged to the potential of battery BA. As armature 218 of relay R moves away from its make contact battery BA is removed from the winding of reset magnet RM thereby causing the reset magnet to release and relay D to be in a condition to respond to electrical signals from the induction pickup coil 18. The cam 99 of timer B is so arranged that the contact spring 216 remains in engagement with contact spring 202 until the cam has substantially completed a revolution, the contact spring 216 being disengaged from contact spring 202 and contact spring 203 being moved into engagement with contact spring 202 substantially one-half second before the revolution of the cam is completed. The gear box 92 is arranged to cause the cam assemblies 98, 99 and 101 to make a complete revolution in substantially one hundred and twenty seconds after the motor B has been set in operation. Substantially one-tenth of a second before the motor B is brought to rest the contact spring assembly 102 controlled by the cam 98 is restored to the initial unoperated condition shown on the drawing. As contact spring 205 thereof moves away from contact spring 206 the operating circuit to the motor B is interrupted thereby stopping the motor and bringing the cams 98, 99 and 101 to rest in the initial home position thereof.

In the event that the armature of relay D is moved into engagement with contact 222 as the result of the shock received by the mine during the launching thereof the timing and control mechanism A is set into operation over the following circuit: negative terminal of battery BA, contacts of the arming clock 44, conductor 194, armature 196 and break contact of relay E, conductor 197, armature and contact 222 of relay D, conductor 223, contact springs 202 and 203 of contact spring assembly 103 of firing mechanism A, conductor 224, motor A from whence the circuit is continued to ground. The contact spring assemblies 102, 103 and 104 of the timing device A are operated by cams 98, 99 and 101 respectively in the same time phase relationship with respect to the starting of the motor A as the correspondingly numbered cam spring assemblies of the timing device B operate with respect to the motor B. When motor A has operated for substantially one second contact spring assembly 102 is actuated by the cam 98 sufficiently to cause the contact springs 205 and 206 to be moved into engagement with each other thereby to close a circuit from motor A by way of conductors 224 and 194 to the negative terminal of battery BA and maintain the motor in operation for a period of time sufficient to cause the cams controlled thereby to complete a revolution after the armature of relay D has been disengaged from contact 222.

The operation of the contact spring assembly 103 of timing device A in response to the movement of cam 99 occurs approximately four seconds after the motor A has started and the engagement of contact spring 216 thereof with contact spring 202 causes battery to be applied from the negative terminal of battery BA by way of contacts of the arming clock, conductor 194, armature 196 and break contact of relay E, conductor 197, armature and contact 222 of relay D, conductor 223, contact springs 202 and 216, conductor 225, connecting device 71 and terminal 75 thereof, conductor 217 and thence to the winding of relay R from whence the circuit is continued to ground thereby causing relay R to operate and the armature 218 and make contact thereof to apply battery to the reset magnet RM of relay D. Reset magnet RM operates over the circuit just described and causes the armature of relay D to be disengaged from contact 222 and moved to a position intermediate contacts 198 and 222. As armature of relay D moves away from contact 222, conductor 223 is disconnected from battery BA thereby causing relay R to release when condenser 108 has discharged sufficiently to maintain a flow of current through the relay winding by way of armature 195 and make contact of the relay of sufficient strength to maintain the relay operated.

The timing and control device A continues to operate until the operating circuit of the motor A is interrupted at contact springs 205 and 206 and controlled by cam 98 thereby stopping the motor A and bringing the cams 98, 99 and 101 thereof to rest at the completion of one revolution of the cams substantially 120 seconds after the motor A has been set in operation.

With the connecting devices 69 and 71 set to the upper position in contact with terminals 74 and 75 respectively, as in the assumed example, the system is adapted to be controlled by pairs of signals received by the relay D in which each signal of the pair is of the opposite polarity from the remaining signal. When a pair of signals comprising elemental signal portions of opposite polarity are received such that the second signal portion of the pair is received within the aforesaid predetermined period of time after the first signal portion of the pair is received, the counting and storage mechanism comprising the cams 143 and 176 is set into operation to count and store signals corresponding respectively to each pair of signals or elemental signal portions so received by the relay D. In the event that the second signal of the pair is of the opposite polarity to the first signal of the pair but is not received within the predetermined period of time, or the second signal is of the same polarity as the first signal, the system comprising the control devices A and B restores to normal and the counting mechanism is not actuated to a new setting.

Let it now be assumed, by way of example, that a vessel having a magnetic signature comprising an elemental portion or characteristic of one polarity followed by an elemental portion or characteristic of the opposite polarity moves within the vicinity of the mine or passes above the mine, the term "polarity" as applied to the magnetic signature of a vessel being defined herein as a variation in the direction of the magnetic field at a fixed point of reference as different portions of the vessel move pass the point of reference. As the first portion of the magnetic signature moves into proximate relation with respect to the pickup coil 18, an electromotive force is generated within the pickup coil sufficient to operate relay D and cause the armature thereof to be moved into engagement with contact 222 or 198, as the case may be. For the purpose of description it may be assumed that the armature of relay D now moves into engagement with contact 222. When this occurs, a circuit is closed from the negative terminal of battery BA by way of the contacts of the arming clock, conductor 194, armature 196 and break contact of relay E, conductor 197, armature and contact 222 of relay D, conductor 223, contact springs 202 and 203 of timing device A, conductor 224, motor A from whence the circuit is continued to ground thereby causing motor A to operate and set the timing device A into operation.

When the timing device A has operated for substantially one-half second cam 98 causes contact springs 205 and 206 to be moved into engagement with each other thereby connecting the motor A to the negative terminal of battery BA over the following circuit: negative terminal of battery BA, contacts 44 of the arming clock, conductor 194, contact springs 206 and 205, conductor 224, motor A and thence to ground. The contact spring 205 is maintained in continuous engagement with contact spring 206 until the motor has been operating for a period of substantially one hundred and twenty seconds at which time the contact spring 205 is disengaged from contact spring 206 by the cam 98 and the motor is brought to rest. When the motor has operated for substantially three seconds the cam assembly 104 thereof is actuated by the cam 101 to the operated position and remains operated for a period of approximately one second thereafter. As contact spring 226 of contact assembly 104 moves into engagement with contact spring 227 a circuit is closed from negative battery on conductor 194 by way of contact springs 228 and 229, conductor 231, contact springs 226 and 227, conductor 219, resistance 221, winding of reset magnet RM from whence the circuit is continued to ground thereby operating the reset magnet RM and restoring the armature of relay D to a position intermediate contacts 198 and 222 and disengaged therefrom. As contact assembly 104 is moved to the operated position by cam 101 the contact springs 209 thereof are moved away from contact springs 208 thereby interrupting the connection between the operating magnet M of relay D and the induction pickup coil 18. This connection, however, is restored as contact assembly 104 moves to the initial position at the completion of a subsequent period of one second and relay D is again in condition to operate in response to the electromotive force generated by the induction pickup coil 18 as the second portion of the ship's signature of opposite polarity moves into effective relation with the induction pickup coil.

When motor A has been operating for four seconds cam 99 thereof causes contact spring 203 to be disengaged from contact spring 202 and contact spring 216 to be moved into engagement with contact spring 202 until cam 99 completes a revolution. As contact spring 216 moves into engagement with contact spring 202 a circuit is closed from contact 222 of relay D by way of conductor 223, contact springs 202 and 216 of timing device A, conductor 25, connecting device 71 and terminal 75 thereof, conductor 217, winding of relay R and thence to ground whereby, in the event that relay D should be operated in such a manner that the armature engages contact 222 thereof as the result of a signal received from the induction pickup coil 18, negative battery is applied to the winding of relay R thereby causing relay R to operate and restore the armature of relay D to a position intermediate the contacts 198 and 222 and disengaged therefrom.

From the foregoing it will be apparent that during the remaining portion of the revolution of the cam 99 the operation of relay D in a direction for the armature thereof to engage contact 222 is ineffective for the reason that such engagement of the contact causes the operation of relay R thereby immediately restoring relay D to the initial unoperated position.

As the armature of relay D moves into engagement with contact 198 in response to the second elemental portion or signal of the pair of signals of opposite polarity during a cycle of operations of the timing device A corresponding to a revolution of the cams thereof, a circuit is closed from negative terminal of battery BA by way of contacts of the arming clock, conductor 194, armature 196 and break contact of relay E, conductor 197, armature and contact 198 of relay D, conductor 199, connecting device 69 and terminal 74 thereof, conductor 201, contact springs 203 and 202 of timing device B, conductor 204, motor B from whence the circuit is continued to ground thereby causing motor B to operate and set timing device B into operation while the cams of timing device A are completing one revolution. When motor B has been running for substantially one second contact spring 205 is moved by cam 98 of timing device B into engagement with contact spring 206 thereby closing a circuit from battery on conductor 194 to the winding of motor B by way of conductor 204 and maintaining motor B in operation until cam 98 has completed a revolution.

As contact spring 229 of timing device B is moved into engagement with contact spring 228 by cam 98 a circuit is closed from negative terminal of battery BA by way of the contacts of the arming clock, conductor 194, contact springs 228 and 229 of timing device A, conductor 231, contact springs 229 and 228 of timing device B, conductor 232, contact springs 233 and 234 of the counting device C, conductor 235, motor C of the counting device from whence the circuit is continued to ground thereby starting motor C and setting the counting device into operation to count a vessel having a magnetic signature comprising two portions of opposite polarity received in predetermined time space relation by the induction pickup coil 18 and relay D. When the motor C has operated for substantially three seconds, contact spring 236 thereof is moved by cam 143 into engagement with contact spring 237 thereby closing a circuit from negative terminal of battery BA by way of the contacts of the arming clock, conductor 194, contact springs 237 and 236 of spring assembly 144, conductor 235, motor C from whence the circuit is continued to ground thereby establishing an operating circuit adapted to maintain motor C in operation until cam 143 has completed a revolution at the completion of a period of time of one hundred and seventy seconds after motor C has started.

In the assumed example it will be recalled that the counting device C had been previously set to count the passage of thirty-five vessels before the contact spring 238 is moved into engagement with contact spring 233 by the cam 176. Cam 176, therefore, is moved through an angle corresponding to one thirty-fifty of the angular displacement of the cam from the adjusted position to the final armed position thereof during each revolution of the cam 143 corresponding to a cycle of operation of the counting device C.

When the timing device A has operated for substantially one hundred and twenty seconds contact spring 102 thereof is disengaged from contact spring 206 thereby interrupting the circuit to motor A and bringing the timing device A to rest. In a similar manner when timing device B has been operating for substantially one hundred and twenty seconds the disengagement of contact spring 205 thereof from contact spring 206 causes the operating circuit to motor B to be interrupted thereby bringing the timing device B to rest at the completion of a revolution of the cam 98. It will be understood, however, that the counting device C continues to operate after timing devices A and B have been brought to rest by reason of the fact that contact spring 236 thereof is not disengaged from spring 237 until, as heretofore stated, cam 143 has completed a revolution at the completion of a period of time of one hundred and seventy seconds after motor C has started. When this occurs, the operating circuit for motor C is interrupted thereby causing motor C to stop and the counting device to be brought to rest at the completion of a cycle of operations thereof.

If it be assumed, for the purpose of description, that the next succeeding thirty-two vessels have magnetic signatures of the same relative polarity as the first vessel which passed the mine, the foregoing cycles of operation of the timing devices A, B and counting device C are repeated, each of the timing and counting devices making one revolution in response to the passage of each of the vessels respectively past the mine and relays D and R operating to control the system during each of these cycles of operations in response to signals received from the induction pickup coil 18.

As the system is again set in operation in response to the approach of the thirty-fourth ship within the vicinity of the mine, the timing devices A and B are set in operation in succession thereby causing the operation of the counting device C. When motor C has been operating for substantially one hundred and fifty seconds, the contact spring 238 thereof is moved into engagement with contact spring 233 and remains in engagement therewith during the remainder of the current cycle of operations of the counting device C. A circuit is thus closed from contact spring 228 of timing device B by way of conductor 232, contact springs 233 and 238 of counting device C, conductor 239, detonating device 37, and thence to ground. The detonating device is not fired at this time, however, for the reason that timing device B has been brought to rest before contact springs 238 and 233 of the counting device are moved into engagement with each other and contact spring 228 of timing device B is therefore disengaged from contact spring 229 thereof. The mine is now in an armed condition in readiness to be fired by the thirty-fifth ship.

As the thirty-fifth ship moves into the vicinity of the mine the first elemental portion of the ship's magnetic signature causes the armature of relay D to move into engagement with contact 222 thereof and thereby operate motor A and set the timing device A into operation. When the motor A has operated for substantially three seconds the movement of contact spring 226 thereof into engagement with contact spring 227 causes the reset magnet RM of relay D to operate and restore the armature of relay D to a position intermediate contacts 198 and 222 and disengaged therefrom. The timing device A continues to operate, however, by reason of the engagement of contact spring 205 thereof with contact spring 206 one second after motor A started. As contact springs 209 of timing device A are moved away from contact springs 208 the connection between the induction pickup coil 18 and the operating magnet M of relay D is interrupted, this connecting being restored one second later as contact assembly 104 moves to the initial position at the completion of the one second interval. Relay D is now in condition to operate in response to a signal of opposite polarity corresponding to a second portion of the magnetic signature of the vessel. As armature of relay D moves into engagement with contact 198 thereof motor B is started thereby setting timing device B into operation during the time the cams of timing device A are completing a revolution. When motor B has been running for substantially one second contact spring 229 of timing device B is moved into engagement with contact spring 228 by cam 98 thereby closing a circuit from the negative terminal of battery BA by way of contacts of the arming clock 44, conductor 194, contact springs 228 and 229, timing device A, conductor 231, contact springs 229 and 228 of timing device B, conductor 232, contact springs 233 and 238 of counting device C, conductor 239, detonating device 37 from whence the circuit is continued to ground thereby operating the detonating device 37 and exploding the mine beneath a vulnerable portion of the thirty-fifth vessel.

In the event that any of the foregoing thirty-five vessels have associated therewith a magnetic signature comprising two portions of opposite polarity such that the first portion of the magnetic signature causes the armature of relay D to be moved into engagement with contact 198 and the second portion of the signature causes the armature of relay D to be moved into engagement with contact 222, the timing device B will be set into operation in response to the first portion of the signal received and timing device A will be set in operation in response to the second portion of the signal. The operation of the timing devices B and A in the order named is believed to be clearly apparent from the foregoing detailed description and the circuits controlling the operation of these devices under this condition of operation are, therefore, not henceforth described in complete detail. It will be noted, however, that when the relay D has been reset by the operation of contact springs 216 and 202 in response to movement of the cam 99 of timing device B at the completion of a period of four seconds after the timing device B has been in operation, the contact spring 216 remains in engagement with contact spring 202 until cam 99 has completed a revolution and any additional signals received by the induction pickup coil 18 having the same polarity as the signal corresponding to the first portion of the ship's signature of sufficient strength to cause the armature of relay D to be removed into engagement with contact 198 thereof causes the operation of relay R thereby resetting relay D.

As the armature of relay D moves into engagement with contact 222 in response to a signal of opposite polarity corresponding to the second portion of the ship's signature received while the timing device B is completing a cycle of operations thereof, motor A is started thereby setting timing device A into operation. The operation of contact spring assembly 102 of timing device A which, it will be recalled, is actuated to circuit closing position by cam 98 when a period of one second has elapsed after motor A has been set in operation causes motor C of the counting device to be set in operation over the following circuit: negative terminal of battery BA by way of the contacts of the arming clock, conductor 194, contact springs 228 and 229 of spring assembly 102 of timing device A, conductor 231, contact springs 229 and 228 of timing device B, conductor 232, contact springs 233 and 234 of counting device C, conductor 235, motor C from whence the circuit is continued to ground thereby starting motor C and setting the counting device into operation to count a vessel, or to close in part the firing circuit to the detonating device 37, as the case may be.

Whenever contact assembly 144 of the counting device C is actuated to the circuit closing position by cam 143 associated therewith, contact spring 241 thereof is moved into engagement with contact spring 242 thereby connecting conductor 215 to conductor 214 and short-circuiting coil M of relay D until cam 143 has completed a revolution. The relay D is thus rendered unresponsive to additional signals received by the pickup coil 18 during the remainder of the revolution of cam 143 of the counting device and the armature of relay D is therefore not brought into engagement with either of the contacts 198 or 222 as the result of variations in the magnetic field detected by the induction pickup coil 18 until a cycle of operations of the counting device C has been completed.

In the event that it is desired to control the firing of mine by pairs of signals of either polarity in which each signal of the pair is of the same polarity as the remaining signal of the pair or of a different polarity than the remaining signal of the pair, the connecting devices 69 and 71 are connected in the position shown in dashed outline on FIG. 15 of the drawings in engagement with terminals 73 and 74 respectively. With the connecting device 69 in engagement with terminal 73, conductor 199 is connected to conductor 223 thereby establishing an electrical connection between the contacts 198 and 222 such that battery is applied to conductor 223 by the operation of relay D regardless of the polarity of the signal received by the induction coil 18 of sufficient strength to move the armature of relay D into circuit closing position.

With the contact spring assembly 103 of the timing device A moved to the position corresponding to the position of rest of cam 99 associated therewith the operation of relay D applies battery by way of conductor 223, contact springs 202 and 203 of timing device A, conductor 224 and thence to motor A thereby causing motor A to start and the timing device A invariably to be set in operation before motor B is started. As contact spring 216 of timing device A is moved by cam 99 into engagement with contact spring 202 the subsequent operation of relay D in response to a second signal of either polarity comprising a second elemental portion of a ship's signature applies battery by way of conductor 223, contact springs 202 and 216 of timing device A, conductor 225, connecting device 71 and terminal 74, conductor 201, contact springs 202 and 203 of timing device B, conductor 204, motor B from whence the circuit is continued to ground thereby starting motor B and setting timing device B into operation while timing device A is performing a cycle of operations. When the cycle of operation of timing device B has progressed sufficiently for contact spring 229 thereof to be moved into engagement with contact spring 228 a circuit is closed from negative terminal of battery BA by way of the contacts of the arming clock, conductor 194, contact springs 228 and 229 of timing device A, conductor 231, contact springs 229 and 228 of timing device B, conductor 232, contact springs 233 and 234 of counting device C, conductor 235, motor C from whence the circuit is continued to ground thereby starting motor C and setting the counting device into operation.

From the foregoing description it will be clearly apparent that with the connecting devices 69 and 71 in engagement with terminals 73 and 74 respectively the timing device A is invariably set into operation by a signal of either polarity received by the induction coil 18 and when a predetermined period of time thereafter has elapsed the timing device B is adapted to be set in operation by relay D in response to a signal of either polarity received by the pickup coil 18. In the event that a second signal is not received sufficient to cause the armature of relay D to engage either of the contacts 198 or 222 during the interval of time between the restoration to normal of the relay D by timing device A and the remainder of the cycle of operations of timing device A, timing device B is not started and timing device A comes to rest at the completion of the cycle of operations without causing the counting device C to be set in operation.

The operation of the system of FIG. 15 in response to a countermine shock will now be described. As the contacts of switch 59 are moved to closed position in response to the countermine shock received by the mine a circuit is closed from the negative terminal of battery BA by way of contacts 44 of the arming clock, conductor 194, contacts of switch 59, conductor 243, winding of relay E from whence the circuit is continued to ground thereby causing relay E to operate and at armature 196 and make contact thereof apply battery by way of conductor 217, winding of relay R from whence the circuit is continued to ground thereby causing relay R to operate and prevent the engagement of the armature of relay D with either of the contacts 198 or 222 by operating the reset magnet RM thereof. A condenser 244 is preferably connected across the contacts of the switch 59 to prevent the release of relay E while the contacts are vibrating in response to a series of rapid impulses or sudden variations in pressure caused by a countermining operation. When the countermine shock has abated sufficiently for relay E to release, battery is removed from relay R causing relay R and the release magnet RM to release and as armature 196 of relay E moves into engagement with the break contact thereof battery is again applied to the armature of relay D and the system is in readiness to receive and respond to a signal from the induction pickup coil 18.

In the event that the countermine shock is received while only one of the motors A or B is running and before sufficient time has elapsed for the second motor to be started in response to the operation of relay D, the operation of relay E prevents the premature starting of the second motor as the result of the countermine shock. In the event that the countermine shock is received while the second timing device is operating, the motors of the first and second timing devices complete their cycle of operations and the counting device C is set in operation to count a ship regardless of the countermine impulse received by the mine.

Figure 16:
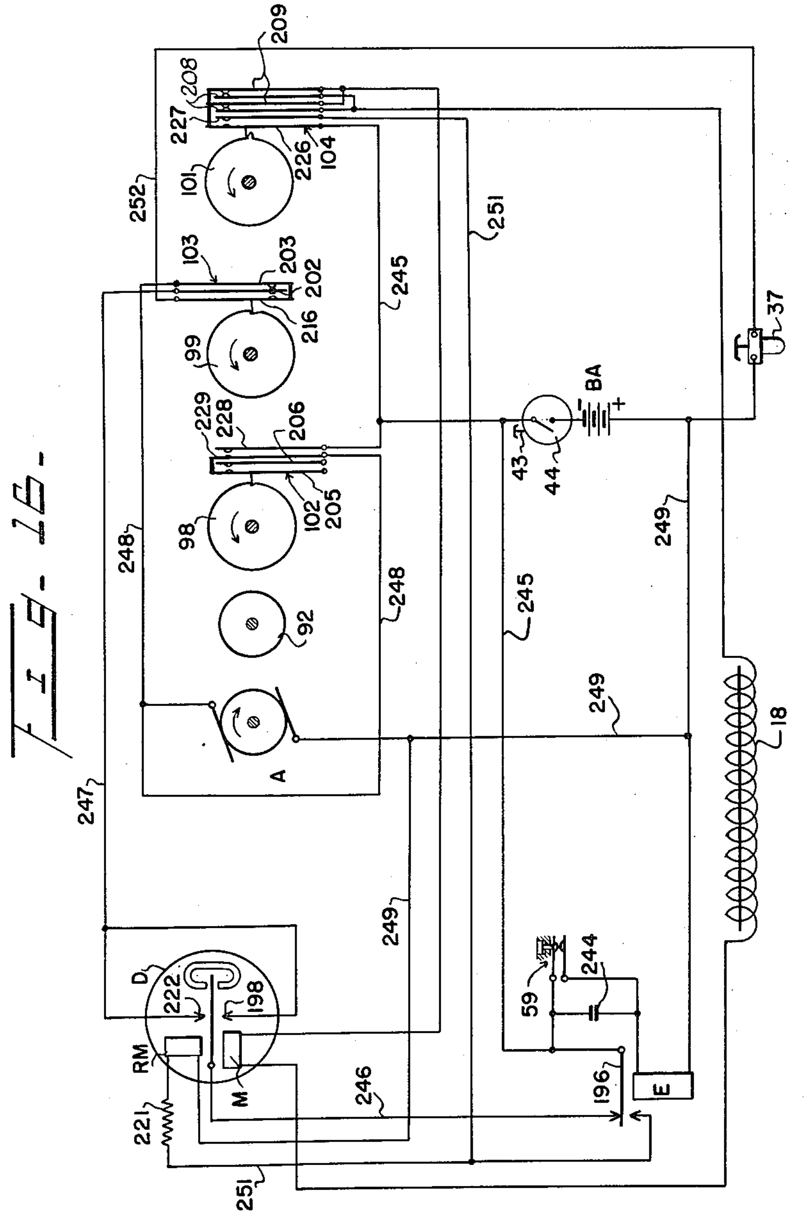
FIG. 16 shows in diagrammatic form an alternative arrangement of a mine firing system employing the timing mechanism of the present invention.

On FIG. 16 is shown an alternative arrangement suitable for firing a mine in response to a pair of magnetic signals of either polarity received from a vessel through the surrounding water by the induction pickup coil 18 in which the timing mechanism of the present invention is employed to reset the detecting relay D when the first signal has been received and to arm the mine for a predetermined period of time thereafter whereby the mine is adapted to be fired by a second signal received from the detecting relay during the aforesaid predetermined period of time. There is also shown on FIG. 16 means for preventing the premature detonation of the mine as the result of a countermine operation, the mechanism employed for this purpose being preferably similar to the anti-countermine arrangement of FIG. 15.

Let it be assumed, by way of example, that the mine employing the system of FIG. 16 has been planted within a body of water for a period of time sufficient for the contacts of the arming clock 44 to close. Let it further be assumed for the purpose of description that the armature of relay D is resting against contact 222 as the result of the shock received during the launching of the mine. The closure of the contacts of the arming clock closes a circuit from negative terminal of battery BA by way of contacts of the arming clock 44, conductor 245, armature 196, break contact of relay E, conductor 246, armature of relay D, contact 222, conductor 247, contact springs 202 and 203 of the timing and control mechanism A, conductor 248, winding of motor A, conductor 249 and thence to the positive terminal of battery BA thereby starting motor A and setting the timing mechanism into operation. When motor A has been operating for substantially one second cam 98 is rotated sufficiently to operate spring assembly 102 to circuit closing position thereby closing a circuit from negative terminal of battery BA by way of contacts of the arming clock 44, conductor 245, contact springs 228 and 229 of the contact spring assembly 102, conductor 248 and thence to the winding of motor A, from whence the circuit is continued by way of conductor 249 to the positive terminal of battery BA thereby to maintain motor A in continuous operation until the cam 98 has made a complete revolution.

When a period of three seconds has elapsed after motor A is set in operation contact spring assembly 104 is actuated by cam 101 to a moved position. As contact spring 226 thereof moves into engagement with contact spring 227 a circuit is closed from negative terminal of battery BA by way of the contacts of the arming clock, conductor 245, contact springs 226 and 227, conductor 251, resistance 221, winding of reset magnet RM of relay D, conductor 249 and thence to the positive terminal of battery BA thereby causing the reset magnet RM to operate and restore relay D to the original unoperated position with the armature thereof intermediate the contacts 198 and 222 and disengaged therefrom. The operation of contact spring assembly 104 at contact springs 227 and 228 thereof interrupts the electrical connection between the induction pickup coil and the operating magnet M of relay D.

When motor A has been operating for a period of substantially 4.2 seconds the contact spring assembly 104 is restored to normal thereby interrupting the circuit to the release magnet RM of relay D and restoring the connection between the operating magnet M of relay D and the induction pickup coil 18. The interruption of the operating circuit of the release magnet RM removes a restraint from the armature of relay D whereby relay D is again free to respond to a signal received from the induction pickup coil 18.

When motor A has been operating for substantially four seconds contact spring 203 is disengaged from contact 202 and contact spring 216 is brought into engagement with contact spring 202 by cam 99. The disengagement of contact spring 203 from contact spring 202 interrupts the circuit between the contacts of relay D and the motor A, and the engagement of contact spring 216 with contact spring 202 closes a circuit from the contacts of relay D by way of conductor 247, contact springs 202 and 216, conductor 252, detonating device 37 and thence by way of conductor 249 to the positive terminal of battery BA. The mine is now armed and remains armed until timing device A has completed a cycle of operations corresponding to one revolution of cam 99 thereof or the mine is exploded before the completion of the cycle of operations, as the case may be. In the event that a second signal is not received by relay D sufficient to cause the armature to be moved into engagement with either of the contacts 198 or 222 thereof before cam 98 has completed a revolution, contact spring 229 is disengaged from contact spring 228 as cam 98 moves into the initial home position thereby interrupting the operating circuit to motor A and bringing the timing device to rest at the completion of the aforesaid cycle of operations. In the event, however, that a second signal is received by relay D during the time contact spring assembly 103 is moved by cam 99 from the initial position thereof the detonator firing circuit is closed from negative terminal of battery BA by way of the contacts of the arming clock 44, conductor 245, armature 196 and break contact of relay E, armature of relay D and contact 198 or 222 thereof, as the case may be, conductor 247, contact springs 202 and 216 of the timing mechanism, conductor 252, detonating device 37, conductor 249 and thence to the positive terminal of battery BA thereby causing the detonating device to operate and fire the mine.

In the event that a shock or pressure impulse is received through the water as the result of a countermining operation, the operation of the inertia switch 59 causes relay E to operate and remain operated during a series of impulses received by the inertia member of the switch 59 in rapid succession by reason of the provision of the condenser 244 connected across the contacts of switch 59. As armature 196 of relay E moves away from the break contact thereof battery is removed from the armature of relay D and as armature 196 engages the make contact of relay E battery is applied by way of conductor 251 and resistance 221 to the winding of the reset magnet RM of relay D thereby preventing the armature of relay D from moving into engagement with either contact 198 or 222 until the reset magnet releases. When the impulses received from the countermine operation have subsided sufficiently for relay E to release the operating circuit to the reset magnet RM is interrupted and the reset magnet releases thereby removing a restraint from the armature of relay D. As armature 196 of relay E moves into engagement with the break contact, negative potential on battery BA is applied to the armature of relay D whereby relay D is again effective to apply negative battery to conductor 247 selectively in accordance with the operated condition of relay D.

Preferably, though not necessarily, contact spring assembly 102 includes a pair of contact springs 205 and 206 adapted to be brought into engagement with each other by cam 93 when the motor A has been operating for a period of substantially one second. These contact springs may, if desired, be employed to control an external circuit comprising a source of electrical power and an indicating device such, for example, as a lamp or other indicating instrument adapted to give a signal during the testing of the system whereby the operation of the system may be readily observed at a distance without the necessity of inspecting the physical movement of the contact spring assembly 102. In like manner and for a like purpose the contact spring assembly 104 of timing device B, FIG. 15, is preferably, though not necessarily, provided with a similar pair of contact springs 226 and 227 whereby the testing and initial adjustments of the various devices and instrumentalities comprising the system of FIG. 15 is facilitated.

By providing an arrangement such as the arrangement of FIG. 15 or FIG. 16, in which the detecting relay is not reset until a timing device has been in operation for substantially three seconds the probability of prematurely firing the mine by an electromagnetic signal received as the result of mine sweeping operations is substantially reduced. Whereas in the arrangement of FIG. 16, the conductor 252 is shown connected to the firing device 37, it will, of course, be understood that, if desired, the conductor 252 may be connected to the counting device C in the manner of the conductor 232 of FIG. 15 and the firing device may be connected to contact spring 238 thereof thereby providing an arrangement in which a predetermined number of vessels are required to move past the mine as a prerequisite condition for arming the mine.

Briefly stated in summary, the present invention contemplates the provision of a new and improved mine firing system and timing control mechanisms therefor in which the timing and switching control elements are of sturdy and rugged construction sufficient to withstand damage or injury thereto as the mine is launched, in which at least one timing mechanism is adapted to perform at intervals a sufficient number of cycles of operation to fire the mine in response to the passage or movement of a predetermined number of vessels within the vicinity of the mine, and in which, if desired, the system may comprise means settable at will to different settings whereby the mine is adapted to be fired by a predetermined number of pairs of signals of opposite polarity or a predetermined number of pairs of signals of either polarity selectively in accordance with the setting of the settable means. In its broader aspect the invention provides for a system including a new and improved timing and control mechanism whereby the mine is fired in response to a predetermined number of signal indications or characteristics respectively comprising pairs of elemental signal portions of which the second elemental signal portion of each pair is received through the surrounding water in predetermined time spaced relation with respect to the first elemental signal portion of the pair and in which new and improved means are provided for preventing the premature firing of the mine as the result of a countermine operation.

While the invention has been described with reference to two examples thereof which give satisfactory results, it will be understood that this has been done for purposes of disclosure and that various changes and substitutions may be readily apparent to those skilled in the art, after understanding the invention herein disclosed, and that the terms employed in the claims are, therefore, to be considered as words of description rather than of limitation.

The invention herein described and claimed may be manufactured and used by or for the Government of the United States of America for governmental purposes without payment of any royalties thereon or therefor.

What is claimed as new and desired to be secured by Letters Patent of the United States is:

1. In a system for firing a mine in response to a predetermined number of pairs of signals received through the surrounding water, signal receiving means including a relay, said relay having a contact element movable selectively to an initial unoperated position and to a circuit closing position, a timing device adapted to be set in operation by said relay as the contact element thereof moves to said circuit closing position, a second timing device, means controlled by the first named timing device for establishing a control connection between the relay and said second timing device during a cycle of operations of the first named timing device, detonating means, and means for firing said detonating means when said second timing device has been set in operation by said relay during a cycle of operations of the first named timing device.

2. In a system of the character disclosed for firing a mine arranged within a magnetic field, means including an electrical relay for detecting variations in said magnetic field, said relay having resettable means for closing a circuit as the relay operates, a timing mechanism having a motor normally connected to said circuit and adapted to be operated by said relay, means for maintaining the motor in operation until the timing mechanism has completed a cycle of operations, a detonating device, means including a pair of circuit closure elements arranged to be closed momentarily by said timing mechanism as the timing mechanism is set in operation for resetting said resettable means to an initial unoperated position, and means including within said timing mechanism for transferring the circuit from the motor to said detonating device during said cycle of operations whereby the detonating device is adapted to be fired by said relay when the relay is operated during the remainder of said cycle of operations of the timing mechanism.

3. In a system of the character disclosed for firing a mine arranged within a magnetic field, means including a relay for detecting variations in said magnetic field, said relay having resettable means for closing a circuit as the relay operates, a timing mechanism having a motor normally connected to said circuit and adapted to be operated by said relay, said timing mechanism having a cam adapted to be rotated by the motor at a reduced rate of rotation with respect to the speed of the motor, means for maintaining the motor in operation until the timing mechanism has completed a cycle of operations, a detonating device, means including a pair of circuit closure elements arranged to be closed momentarily by said timing mechanism as the timing mechanism is set in operation for resetting said resettable means to an initial unoperated position, and means included within said timing mechanism and controlled by said cam for connecting said detonating device to said circuit when the cam has rotated a predetermined amount during said cycle of operations whereby the detonating device is adapted to be fired by said relay when the relay is operated during the remainder of said cycle of operations.

4. In a system for firing a mine selectively in response to a pair of signals received through the surrounding water in predetermined time spaced relation, signal receiving means including a relay, a timing mechanism adapted to be operated by said relay as the first signal of said pair of signals is received, means for causing said timing mechanism to continue operation until a cycle of operations thereof has been completed, means included within the timing mechanism for momentarily resetting the relay to an initial unoperated position during a predetermined fractional portion of the cycle of operations of the timing mechanism, a second timing mechanism adapted to be set in operation by said relay in response to the second signal of said pair of signals received during the remaining portion of the cycle of operations of the first named timing mechanism after the relay has been reset, a counting mechanism adapted to be set in operation by said second timing mechanism during a cycle of operations of the first named timing mechanism thereby to count said pair of signals received by said signal receiving means, detonating means, means on said counting mechanism for closing a circuit when a predetermined number of pairs of signals have been counted thereby, and means including said circuit closing means for firing said detonating means in response to the second signal of the next succeeding pair of signals received during a cycle of operations of the first named timing mechanism.

5. In a system for firing a mine disposed within a body of water, means for receiving signals through the surrounding water, a pair of motor driven timing devices adapted to perform a cycle of operations in successive order in response to signals received by said signal receiving means, means for bringing each of said timing devices to rest when a cycle of operations thereof has been completed, a counting device having a plurality of moved positions and a final home position and adapted to be operated by said timing devices during said cycle of operations, a firing circuit, a pair of contacts on said counting device included within said firing circuit and adapted to be closed as the counting device is moved to said final home position, means settable at will for selecting the number of cycles of operations of said pair of timing devices to be counted by said counting device before said pair of contacts are closed, a detonating device included within said firing circuit adapted to fire the mine, and means including a pair of circuit closing devices respectively arranged on each of said timing devices for closing said firing circuit during the next succeeding cycle of operations of the timing devices after said pair of contacts are closed.

6. In a system for firing a mine in response to a predetermined number of signals received through the surrounding water, each of said signals comprising a pair of elemental signal portions of opposite polarity received in predetermined time spaced relation, signal receiving means including a relay, a movable element adapted to engage a pair of contacts selectively in accordance with the polarity of each of said elemental portions of the signal, a pair of normally inactive timing mechanisms, each of said mechanisms having a plurality of circuit closing elements, means for operating said circuit closing elements in predetermined sequential order, a pair of motors respectively adapted to cause each of the timing mechanisms to perform a cycle of operations, means including a plurality of circuit connections for causing either of said motors to be selected and perform said cycle of operations selectively in accordance with the contact engaged by said movable element in response to the first elemental portion of the signal, means controlled by the selected one of said timing mechanisms for momentarily restoring the movable element of said relay to an initial position intermediate said pair of contacts and disconnected therefrom, means including a pair of circuit closing elements on the selected timing mechanism for causing the other of said timing mechanisms to perform a cycle of operations as the other of said contacts is engaged by said movable element in response to a second elemental portion of the signal of opposite polarity from the first elemental portion thereof while the selected timing mechanism is performing said cycle of operations, and means controlled by said other of the timing mechanisms for counting signals respectively comprising said pairs of elemental signal portions.

7. In a system for firing a mine in response to a predetermined number of pairs of signals received through the surrounding water, signal receiving means including a relay having a contact element movable to an initial unoperated position and to a circuit closing position in engagement with either one of a pair of contacts selectively in accordance with the polarity of each of the signals received, a pair of timing devices respectively associated with each of said contacts and adapted to be set in operation in successive order in accordance with the selective engagement of the contacts by said movable contact element, means for resetting said relay to said initial unoperated position, means controlled by the first selected timing device for momentarily operating said relay resetting means whereby the second timing device is adapted to be set in operation as the other of said pair of contacts is engaged by said movable element, and means including a pair of contact closing elements on the selected timing device for momentarily operating said relay resetting means in response to the engagement of the contact associated with the selected timing device by said movable element while the selected timing device is performing a cycle of operations.

8. In a system for firing a mine in response to a predetermined number of signals received through the surrounding water, each of said signals comprising a pair of elemental signal portions received in predetermined time spaced relation, signal receiving means including a relay having a movable element adapted to engage a pair of contacts selectively in accordance with the polarity of each of said elemental portions of the signal, a pair of normally inactive timing mechanisms, each of said mechanisms having a plurality of circuit closing elements adapted to be operated in predetermined sequential order, means for operating said circuit closing elements, a pair of motors respectively adapted to cause each of the timing mechanisms to perform a cycle of operations thereof, means including a plurality of circuit connections for causing either of said motors to be selected and perform a cycle of operations selectively in accordance with the particular contact engaged by said movable element in response to the first elemental portion of said signal, means controlled by the selected timing mechanism for momentarily restoring the movable element of said relay to an initial position intermediate said pair of contacts and disengaged therefrom, means including a pair of circuit closing elements on the selected timing mechanism for causing the other of said timing mechanisms to perform a cycle of operations as the other of said contacts is engaged by said movable element in response to the second elemental portion of the signal of opposite polarity from the first elemental portion thereof while the selected timing mechanism is performing said cycle of operations, a counting device having a pair of contacts adapted to be closed when a predetermined number of pairs of elemental signal portions are counted thereby, means controlled by said other of the timing mechanisms for causing said elemental signal portions to be counted by said counting device, detonating means adapted to fire the mine, and means including said pair of closed contacts on said counting device for operating said detonating device in response to a second elemental portion of the next succeeding signal of opposite polarity from the first elemental portion thereof.

9. In a system for firing a mine selectively under control of variations in the magnetic field adjacent thereto, a mine casing having an induction coil therein adapted to generate an electromotive force in response to each of said variations in the magnetic field, a circuit connected to said induction coil, a relay included within said circuit and adapted to be operated by said electromotive force, said relay having means for closing a control circuit as the relay operates, a source of electrical power, a timing device having a plurality of contact elements adapted to be operated in predetermined successive order during a cycle of operations of the timing device, a motor for operating said timing device, means including a normally closed contact element on said timing device for causing said motor to be set in operation as the control circuit is closed by said relay, means for causing the motor to continue to operate until the timing device has completed a cycle of operations, means controlled by said timing device for momentarily resetting said relay to an initial unoperated position during said cycle of operations when a predetermined period of time has elapsed after the motor has been set in operation, means for interrupting the circuit between said induction coil and the relay concurrently with the resetting of the relay to said initial unoperated position, said last named means being adapted to restore the circuit between the induction coil and the relay when the relay has been reset, an electroresponsive detonating device, and means controlled by said timing mechanism for operatively connecting said detonating device to said control circuit when the relay has been reset whereby the detonating device is adapted to be operated by said source of power as the relay operates in response to a variation in said magnetic field during the remaining portion of the cycle of operations of said timing mechanism.

10. In a system of the character disclosed for firing a mine in response to a predetermined number of pairs of signals of either polarity received through the surrounding water, means for receiving said signals selectively in accordance with the polarity thereof, a pair of motor driven devices adapted to actuate a plurality of contact elements in predetermined succession during a cycle of operations of the devices respectively corresponding to each of said signals, means controlled by said signal receiving means for causing said motor driven devices to perform said cycle of operations, means including a counting mechanism controlled by the contact elements of said timing devices for firing the mine when a predetermined number of cycles of operations of the timing devices has been counted, and a switching device settable at will to different positions for controlling a plurality of circuit connections between said timing devices and said signal receiving means whereby the timing devices are adapted to be set in operation selectively in accordance with the polarity of the first signal of each pair when the switching device is set to one of said positions and the timing devices are adapted to be set in operation in a predetermined order of sequence regardless of the polarity of the first signal of each pair when the switching device is set to another of said positions.

11. In a system of the character disclosed for firing a mine arranged within a body of water, means for detecting signals received through the surrounding water and including a relay adapted to close a control circuit as the relay operates, a cyclic timing device having a plurality of contact elements adapted to be operated during a cycle of operations thereof, means for operating said timing device, means including one of said contact elements for operatively connecting said operating means to said control circuit whereby the timing device is adapted to be set in operation as the relay operates, means including a second relay controlled by another of said contact elements for resetting said first named relay to an initial position, means including a condenser adapted to be connected to said second relay as the relay operates thereby to prevent the release of the second relay until sufficient time has elapsed for the first named relay to be reset, a second cyclic timing device, means controlled by a third contact element of the first named timing device for operatively connecting the second timing device to the first named relay after the first named relay has been reset whereby the second timing device is adapted to be set in operation by the first named relay while the first named timing device is performing a cycle of operations, detonating means, and means including a counting mechanism controlled by said timing devices for operating said detonating means when a predetermined number of cycles of operations of the timing devices have been performed.

12. In a mine firing system adapted to be controlled by signals received through the surrounding water, in combination, signal receiving means including a relay adapted to close a control circuit as each of the signals is received, a pair of timing devices adapted to be set in operation selectively in succession as said control circuit is closed, each of said timing devices being adapted to perform a cycle of operations corresponding respectively to each of said signals, means on each of the timing devices for bringing the timing device to rest at the completion of said cycle of operations, a cyclic counting mechanism controlled by said timing devices and adapted to count the number of cycles of operations thereof, means on said counting mechanism for rendering said relay unresponsive to said signals while a cycle of operations is being counted thereby, a firing circuit having a detonating device therein, and means for arming said firing circuit when a predetermined number of cycles of operations have been counted by said counting mechanism.

13. In a system for firing a mine in response to a plurality of signals received through the surrounding water, each of said signals comprising two elemental signal portions, means including a relay for receiving said signals, a control circuit adapted to be closed by said relay as each elemental portion of said signals is received, a pair of cyclic timing mechanisms, means for causing one of said timing mechanisms to perform a cycle of operations as the control circuit is closed by said relay in response to the first elemental portion of said signal received by said signal receiving means, means on said one of said timing mechanisms for transferring said control circuit to the second timing mechanism whereby the second timing mechanism is adapted to perform a cycle of operations as the control circuit is closed by said relay in response to the second elemental portion of said signal received by said signal receiving means, a counting device operable in unit cycles, means including a pair of circuit closing devices respectively arranged on said pair of timing mechanisms for completing an electrical control connection to said counting device, means for bringing the counting device to rest at the completion of each of said unit cycles of operations, detonating means, and means effective when said counting device has made a predetermined number of unit cycles of operations for transferring said electrical control connection from the counting device to said detonating means whereby the detonating means is adapted to be fired during the next succeeding cycle of operations of said timing mechanisms.

14. In a system of the character disclosed for firing a mine in response to variations in the magnetic field adjacent thereto corresponding respectively to different portions of the magnetic signature of a vessel, means including an electrical relay for detecting the variations in said magnetic field, a pair of contacts on said relay adapted to be closed as the relay operates, a normally inactive motor driven timing device having a plurality of contact elements adapted to be opertaed in predetermined sequential order, means controlled by said pair of contacts for setting the motor in operation as the relay operates in response to the first of said variations in the magnetic field, means for maintaining said motor in operation until the timing device has completed a cycle of operations, means controlled by at least one of said contact elements for momentarily restoring said relay to an initial unoperated condition when the motor has operated for a predetermined period of time during said cycle of operations, electroresponsive detonating means, and means including another of the contact elements on said timing device for operatively connecting said detonating means to the contacts of said relay when the relay has been restored to said initial unoperated condition whereby the detonating means is adapted to explode the mine as the relay operates in response to a second variation in said magnetic field during the remainder of the cycle of operations of said timing device.

15. In a system of the character disclosed for firing a mine in response to variations in the magnetic field adjacent thereto caused by a vessel moving within the vicinity of the mine, means including an electrical relay for detecting said variations in the magnetic field, a normally inactive timing mechanism comprising a plurality of contact elements, a plurality of cams on said timing mechanism adapted to operate said contact elements in predetermined sequential order, means including a motor for operating said cams, a source of electrical power, means including a plurality of circuit connections for causing the motor to be operated by said source of power selectively under control of said relay, means controlled by one of said contact elements for causing the motor to continue to operate until a cycle of operations of the timing mechanism has been completed, means controlled by another of said contact elements for restoring said relay to an initial unoperated position during said cycle of operations when a predetermined period of time has elapsed after the timing device has been set in operationo, an electroresponsive detonating device, and means controlled by said timing mechanism for operatively connecting said detonating device to said relay when the relay has been restored to said initial unoperated position whereby the detonating device is adapted to be fired by the relay during the remainder of the cycle of operations of said timing mechanism.

16. An arming device for a mine adapted to operate in unit cycles, a counting device means controlled by a signal received through the surrounding water for initiating a cycle of operations of the counting device, a rotatable contact actuating element adapted to rotate through a plurality of revolutions corresponding respectively to each of said cycles of operation, means including a pair of contacts controlled by said contact actuating element for causing said counting device to be brought to rest at the completion of each of said unit cycles of operation, an adjustable arming cam settable at will selectively to different settings corresponding to the number of signals to be counted by said counting device, means including a Geneva movement for actuating said arming cam through a fractional part of a revolution during each cycle of operations of said counting device, a firing circuit for said mine, and means controlled by said arming cam for rendering said firing circuit effective when the arming device has made a predetermined number of unit cycles of operation.

17. A counting device for a mine comprising a rotatable cam member having an initial home position, means including a speed reducing device for causing said cam member to rotate through a revolution corresponding to a cycle of operations of the device, means controlled by said cam member for bringing the device to rest at the completion of said cycle of operations, a second rotatable cam member having an arming position and a plurality of moved positions corresponding respectively to the number of cycles of operations of the device required to actuate the second cam member to said arming position, means operable at will for setting said second rotatable cam member selectively to any of said moved positions, means including a Geneva movement for causing said second rotatable cam member to be moved from a moved position to the next succeeding position during a predetermined fractional portion of a revolution of the first named cam member, a firing circuit, and means controlled by said second rotatable cam member for arming said firing circuit as the second cam member moves into said arming position.

18. In a marine mine, the combination of an electric motor and a plurality of connected rotatable cams, a speed reducing device connected to said motor for causing the cams to operate at a substantially reduced rate of rotation with respect to the speed of the motor, a pair of normally open contacts adapted to be closed by one of the cams as the cam moves away from an initial home position and remain closed until the cam has rotated through a revolution, a pair of normally closed contacts adapted to be interrupted momentarily by a second one of said cams as the cam moves away from said initial home position, signal detecting circuit means including a relay adapted to be operated when a signal is received through the surrounding water, said detecting means also including said pair of normally closed contacts whereby the circuit means is rendered ineffective to operate the relay in response to signals received thereby when the normally closed contacts are open, first and second contacts, a third contact normally in engagement with said first contact and adapted to be disengaged from the first contact and moved into engagement with said second contact by a third one of said cams in predetermined time delayed relation with respect to the momentary interruption of said pair of normally closed contacts, said last named cam being adapted to restore said third contact into engagement with said first contact and into disengagement with respect to said second contact as the last named cam moves into said initial home position, a circuit including said first and third contacts for initiating operation of said motor under control of said relay as the relay operates, a holding circuit including said pair of normally open contacts for maintaining the motor in continuous operation until a revolution of said one of the cams has been completed, and a firing circuit including said second and third contacts and adapted to be rendered effective to fire the mine under control of the relay as the relay operates when the second and third contacts are closed.

References Cited in the file of this patent

UNITED STATES PATENTS 2,399,523 Van Atta et al. ---------- Apr. 30, 1946

FOREIGN PATENTS 803,907 France --------------- July 20, 1936